(12) United States Patent  
Gunasekaran et al.

(10) Patent No.: US 11,975,285 B2  
(45) Date of Patent: May 7, 2024

(54) TILTED CELL HONEYCOMB BODY, EXTRUSION DIE AND METHOD OF MANUFACTURE THEREOF

(71) Applicant: CORNING INCORPORATED, Corning, NY (US)

(72) Inventors: Natarajan Gunasekaran, Painted Post, NY (US); David Robert Heine, Hammondsport, NY (US); Weidong Li, Bellevue, WA (US); Craig Louis Stratton, Campbell, NY (US); Neng Wang, Wooster, OH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/293,694

(22) PCT Filed: Nov. 1, 2019

(86) PCT No.: PCT/US2019/059334  
§ 371 (c)(1),  
(2) Date: May 13, 2021

(87) PCT Pub. No.: WO2020/101911  
PCT Pub. Date: May 22, 2020

(65) Prior Publication Data  
US 2022/0001321 A1    Jan. 6, 2022

Related U.S. Application Data

(60) Provisional application No. 62/767,656, filed on Nov. 15, 2018.

(51) Int. Cl.  
*B01D 46/24* (2006.01)

(52) U.S. Cl.  
CPC ......... *B01D 46/249* (2021.08); *B01D 46/247* (2013.01); *B01D 46/2484* (2021.08); *B01D 46/2486* (2021.08)

(58) Field of Classification Search  
None  
See application file for complete search history.

(56) References Cited

U.S. PATENT DOCUMENTS 760,194 A    5/1904    Graham  
3,885,977 A    5/1975    Lachman et al.  
(Continued)

FOREIGN PATENT DOCUMENTS

CN    204457951 U    7/2015  
DE    102006024075 A1    11/2007  
(Continued)

OTHER PUBLICATIONS

Murata et al., machine translation JP 2009/095827, May 7, 2009 (Year: 2009).*

(Continued)

*Primary Examiner* — Mary I Omori  
(74) *Attorney, Agent, or Firm* — Russell S. Magaziner

(57) ABSTRACT

A honeycomb body having a repeating channel structure formed of intersecting porous walls. The repeating channel structure comprises a first channel type defined by at least four first surfaces, at least two of the at least four first surfaces are parallel to one another; and a second channel type having at least four second surfaces, wherein four or more of the at least four second surfaces are non-parallel with one another. Repeating channel structure is repeated in the honeycomb body. Honeycomb extrusion dies and methods of manufacturing the honeycomb body are provided, as are other embodiments.

16 Claims, 12 Drawing Sheets

(56) References Cited

U.S. PATENT DOCUMENTS

| | | | |
|---|---|---|---|
| 5,332,703 A | 7/1994 | Hickman | |
| 6,159,578 A | 12/2000 | Ichikawa | |
| 6,221,308 B1 | 4/2001 | Peng | |
| 6,259,078 B1 | 7/2001 | Araya | |
| 6,391,813 B1 | 5/2002 | Merkel | |
| 6,541,407 B2 | 4/2003 | Beall et al. | |
| 7,017,278 B2 | 3/2006 | Kato | |
| 7,247,184 B2 | 7/2007 | Frost | |
| 7,596,885 B2 | 10/2009 | Adrian et al. | |
| 8,012,234 B2 | 9/2011 | Komori et al. | |
| 8,407,915 B2 | 4/2013 | George et al. | |
| 8,617,659 B2 | 12/2013 | Domey et al. | |
| 8,974,724 B2 | 3/2015 | Day et al. | |
| 9,005,517 B2 | 4/2015 | Bronfenbrenner et al. | |
| 9,038,284 B2 | 5/2015 | Feldman et al. | |
| 9,067,831 B2 | 6/2015 | Chapman et al. | |
| 9,085,089 B2 | 7/2015 | Noni et al. | |
| 9,132,578 B2 | 9/2015 | Anthony et al. | |
| 9,335,093 B2 | 5/2016 | Feldman et al. | |
| 9,440,373 B2 | 9/2016 | Feldman et al. | |
| 9,446,560 B2 | 9/2016 | Bronfenbrenner et al. | |
| 9,452,578 B2 | 9/2016 | Bronfenbrenner et al. | |
| 9,789,633 B2 | 10/2017 | Akarapu et al. | |
| 9,809,992 B1 | 11/2017 | Barlow | |
| 9,828,298 B2 | 11/2017 | Deneka et al. | |
| 9,833,927 B2 | 12/2017 | Chapman et al. | |
| 9,834,481 B2 | 12/2017 | Chapman et al. | |
| 9,862,650 B2 | 1/2018 | Gunasekaran et al. | |
| 2004/0266619 A1* | 12/2004 | Bernas | B32B 3/02 |
| | | | 428/116 |
| 2005/0076627 A1* | 4/2005 | Itou | B01D 46/247 |
| | | | 55/523 |
| 2005/0079975 A1 | 4/2005 | Fujita | |
| 2006/0051556 A1 | 3/2006 | Ohno et al. | |
| 2008/0124517 A1* | 5/2008 | Beall | B01D 46/2492 |
| | | | 428/118 |
| 2009/0239030 A1 | 9/2009 | Cai et al. | |
| 2011/0030357 A1 | 2/2011 | Vincent et al. | |
| 2011/0118486 A1* | 5/2011 | Dubois | B01J 8/02 |
| | | | 568/594 |
| 2014/0298779 A1* | 10/2014 | Miyairi | F01N 3/035 |
| | | | 60/311 |
| 2014/0318093 A1* | 10/2014 | Patt | B01D 46/2482 |
| | | | 55/529 |
| 2015/0275726 A1 | 10/2015 | Tamai et al. | |
| 2016/0263567 A1 | 9/2016 | Mori | |
| 2018/0001517 A1 | 1/2018 | Akarapu et al. | |
| 2018/0099240 A1* | 4/2018 | Mori | B01D 46/2455 |

FOREIGN PATENT DOCUMENTS

| | | | | |
|---|---|---|---|---|
| EP | 1512461 A1 | | 3/2005 | |
| JP | 2009095827 A | * | 5/2009 | ......... B01D 46/2418 |
| WO | 2008/066765 A1 | | 6/2008 | |
| WO | 2008/066795 A2 | | 6/2008 | |
| WO | 2009/017642 A1 | | 2/2009 | |
| WO | 2014/046912 A1 | | 3/2014 | |

OTHER PUBLICATIONS

International Search Report and Written Opinion of the International Searching Authority; PCT/US2019/059334; dated Feb. 12, 2020; 10 pages; European Patent Office.

* cited by examiner

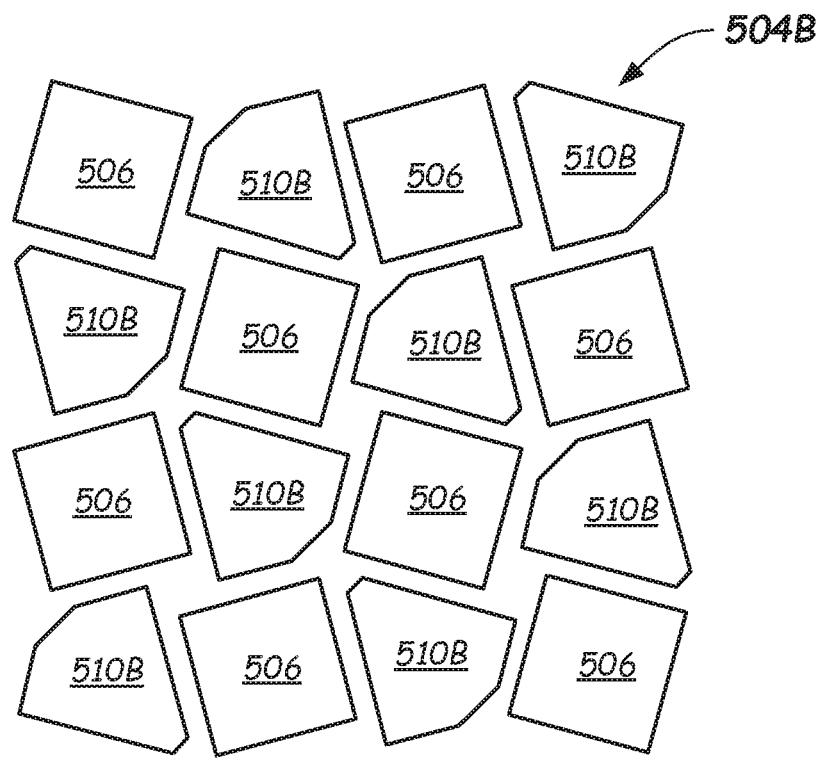
FIG. 5B
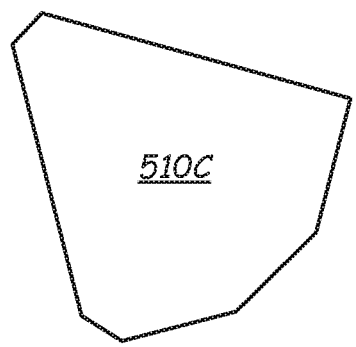 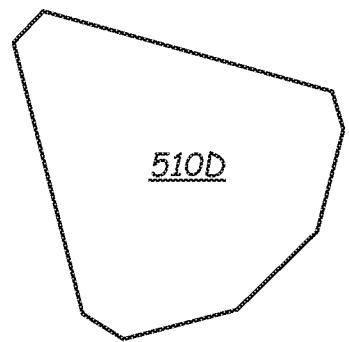
FIG. 5C     FIG. 5D

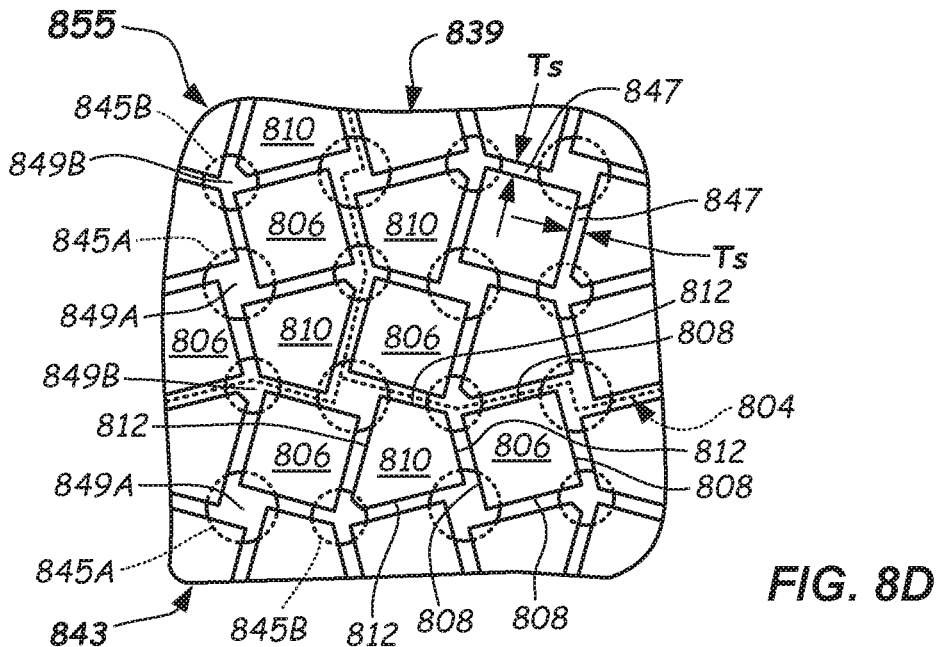

902: Providing A Honeycomb Extrusion Die Comprising A Die Body And An Array Of Die Pins Formed In The Die Body Forming A Die Pin Repeating Structure, Die Pin Repeating Structure Further Comprising: A First Die Pin Type At Least Partially Defined By Four First Die Surfaces, At Least Two Of The Four First Die Surfaces Are Parallel To One Another; And A Second Die Pin Type Having At Least Four Second Surfaces, At Least Four Of The At Least Four Second Surfaces Are Non-parallel With One Another 904: Extruding A Plasticized Batch Composition Through The Honeycomb Extrusion Die To Produce A Green Honeycomb Body

TILTED CELL HONEYCOMB BODY, EXTRUSION DIE AND METHOD OF MANUFACTURE THEREOF

This is a national stage application under 35 U.S.C. § 371 of International Application No. PCT/US2019/059334, filed on Nov. 1, 2019, which claims the benefit of priority under 35 U.S.C. § 119 of U.S. Provisional Application No. 62/767,656 filed on Nov. 15, 2018, the content of which is incorporated herein by reference in its entirety.

FIELD

Embodiments of the disclosure relate to honeycomb bodies, and more particularly to honeycomb bodies used as catalyst supports and/or particulate filters in engine exhaust systems.

BACKGROUND

Catalytic converters can include a honeycomb body having a plurality of intersecting porous walls forming co-parallel, axially-extending channels. The walls are typically made up of a ceramic material such as cordierite, aluminum titanate, or silicon carbide. Various channels of the ceramic honeycomb body may act as a catalyst support and may be coated with a catalyst-containing washcoat. Once coated, the coated ceramic honeycomb body is disposed in a can or other suitable housing.

SUMMARY

In some embodiments of the disclosure, a honeycomb body is provided that is useful as a substrate in a catalytic converter or in a particulate filter.

In some embodiments of the disclosure, a honeycomb body is provided that comprises intersecting porous walls forming a repeating channel structure, the repeating channel structure further comprising: a first channel type with a first cross-sectional area in transverse cross-section and a second channel type of a second cross-sectional area in transverse cross-section that is different than the first cross-sectional area.

In other embodiments of the disclosure, a honeycomb body is provided that comprises intersecting porous walls forming a repeating channel structure, the repeating channel structure further comprising: a first channel type at least partially defined by four first surfaces, at least two of the four first surfaces are parallel to one another; and a second channel type having at least four second surfaces, wherein four or more of the at least four second surfaces are non-parallel with one another.

In other embodiments of the disclosure, a honeycomb extrusion die is provided. The honeycomb extrusion die comprises a die body comprising an outlet face, and an array of die pins formed in the die body and forming a die pin repeating structure, the die pin repeating structure further comprising: a first die pin type at least partially defined by four first pin surfaces, at least two of the four first pin surfaces are parallel to one another, and a second die pin type having at least four second pin surfaces, wherein four or more of the at least four second pin surfaces are non-parallel with one another.

In yet further embodiments of the disclosure, a method of manufacturing a honeycomb body is provided. The method comprises providing a honeycomb extrusion die comprising a die body and an array of die pins formed in the die body forming a die pin repeating structure, the die pin repeating structure further comprising: a first pin type at least partially defined by four first pin surfaces, at least two of the four first die surfaces are parallel to one another; and a second pin type having at least four second pin surfaces, wherein four or more of the at least four second pin surfaces are non-parallel with one another; and extruding a plasticized batch composition through the honeycomb extrusion die to produce a green honeycomb body.

Numerous other features and aspects are provided in accordance with these and other embodiments of the disclosure. Further features and aspects of embodiments will become more fully apparent from the following detailed description, the claims, and the accompanying drawings.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

FIG. 5B schematically illustrates another alternative configuration of the repeating channel structure wherein the channels of the second channel type comprise six sides (e.g., an irregular concave hexagon) according to one or more embodiments of the disclosure.

FIG. 5C schematically illustrates an alternative configuration of the second channel type comprising seven sides (e.g., an irregular concave heptagon) that can be substituted for the second channel type in FIG. 5B according to one or more embodiments of the disclosure.

FIG. 5D schematically illustrates another alternative configuration of the second channel type comprising eight sides (e.g., an irregular concave octagon) that can be substituted for the second channel type in FIG. 5B according to one or more embodiments of the disclosure.

FIG. 8D schematically illustrates a partial front view of an outlet face of the honeycomb extrusion die of FIG. 8A illustrating example feedhole locations (shown as dotted circles) according to one or more embodiments of the disclosure.

FIG. 9 illustrates a flowchart depicting a method of manufacturing a honeycomb body comprising the repeating channel structure according to one or more embodiments of the disclosure.

DETAILED DESCRIPTION

Figure 1A:
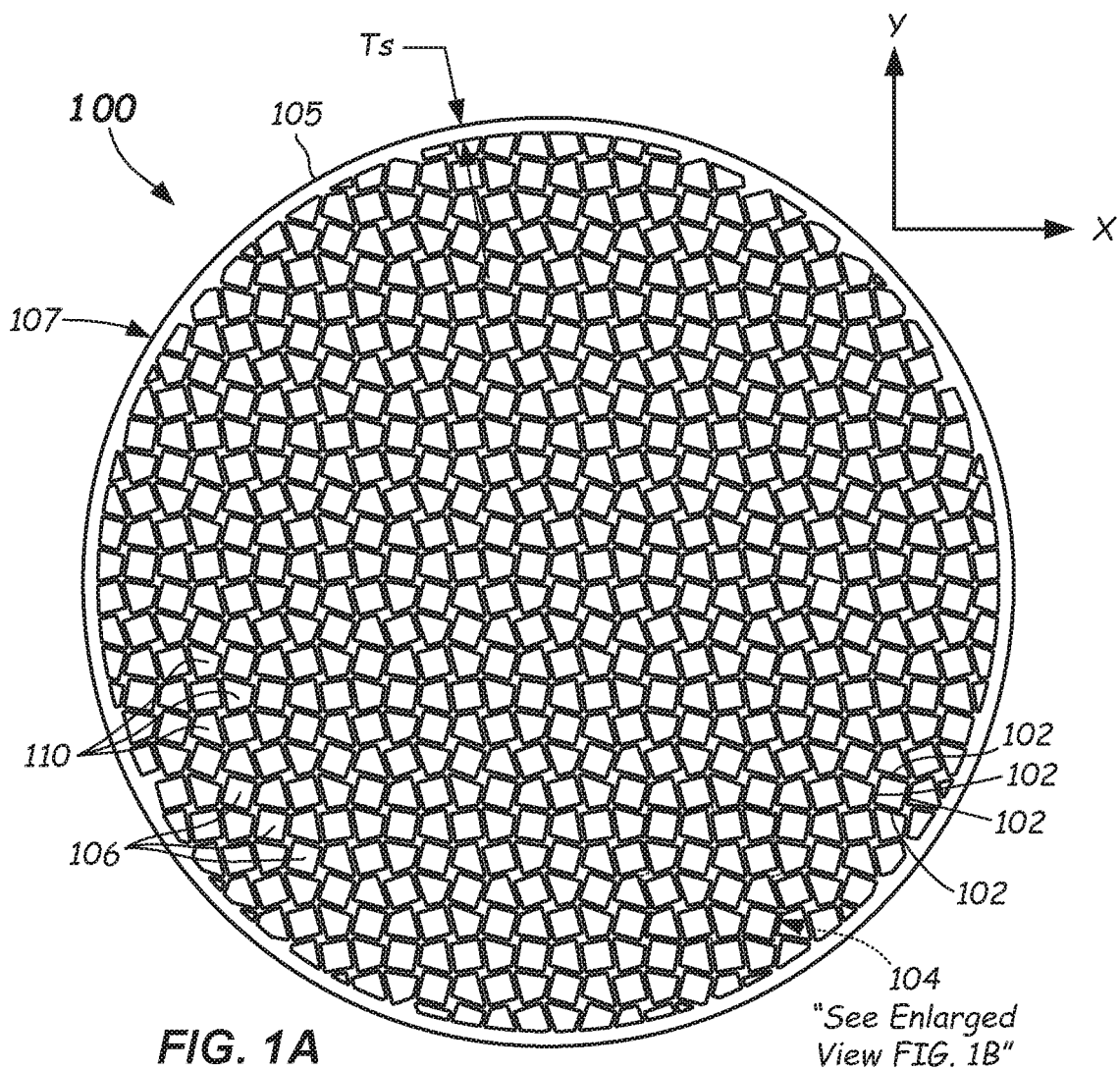
FIG. 1A schematically illustrates an end view of a honeycomb body comprising a repeating channel structure comprising a tilted wall structure according to one or more embodiments of the disclosure.

Reference will now be made in detail to the example embodiments of this disclosure, which are illustrated in the accompanying drawings. In describing the embodiments, numerous specific details are set forth in order to provide a thorough understanding of the disclosure. However, it will be apparent to a person of ordinary skill in the art that embodiments of the disclosure may be practiced without some or all of these specific details. In other instances, well-known structural or functional features and/or process steps have not been described in detail so as not to unnecessarily obscure embodiments the disclosure. Structural and functional features of the various embodiments described herein may be combined with each other, unless specifically noted otherwise.

In view of the problems of the prior art, embodiments of this disclosure relate to an improved honeycomb body. The honeycomb body may be configured for use in a catalytic converter (including exhaust components referred to as a diesel oxidation catalyst (DOC)), that is, it may be a substrate for deposit of a washcoat on or in the porous walls thereof, wherein the catalyst can comprise one or more catalyst materials such as noble metals such as platinum, palladium, rhodium, combinations, and the like. These one or more metals catalyze a reaction with the exhaust stream, such as of an exhaust stream expelled from an internal combustion engine exhaust (e.g., automotive engine or diesel engine). Other metals may be added such as nickel and manganese to block sulfur absorption by the washcoat. In some embodiments including a catalyst-containing washcoat, the reaction may oxidize carbon monoxide and oxygen into carbon dioxide, for example. Moreover, modern three-way catalysts (TWC) may also reduce oxides of nitrogen (NOx) to nitrogen and oxygen. Additionally, unburnt hydrocarbons may be oxidized to carbon dioxide and water.

The honeycomb bodies may be made of an intersecting matrix of walls of any suitably porous material (e.g., porous ceramic). The catalytic material(s) may be suspended in a washcoat of inorganic particulates and a liquid vehicle and applied to the walls of honeycomb body, such as by coating. Thereafter, the coated honeycomb body may be wrapped with a cushioning material and received in a can (e.g., a cylindrical or other shaped housing) via a canning process to produce a catalytic converter or particulate filter (wherein at least some, and possibly all, of the channels can be plugged).

In some embodiments, substrates for catalytic converter and particulate filter applications may benefit from higher open surface area. In addition, lower pressure drop across the honeycomb is continuously being sought, but can be illusive. Therefore, in accordance with some embodiments of the disclosure, honeycomb bodies comprising low back pressure configurations can be provided. Further, in accordance with some embodiments of the disclosure, honeycomb bodies comprising relatively high open surface area configurations can be provided.

In one or more embodiments, the honeycomb body comprises intersecting porous walls forming a matrix of repeating channel structures that can be arranged in a repeating pattern throughout the honeycomb body. Each of the repeating channel structures of the honeycomb body are comprised of an arrangement of first channel type and second channel types. The first channel type can comprise four wall surfaces, wherein at least two of the four surfaces are parallel. In some embodiments, two pairs of surfaces are provided, and each pair of surfaces are parallel with one another (e.g., a square, a rectangle, or a parallelogram).

Further descriptions of embodiments of honeycomb bodies, catalytic converters, particulate filters, exhaust systems comprising the honeycomb bodies, honeycomb extrusion dies configured to form the honeycomb bodies, and methods of manufacturing the honeycomb bodies are provided with reference to FIGS. 1A-9 herein.

Figure 1B:
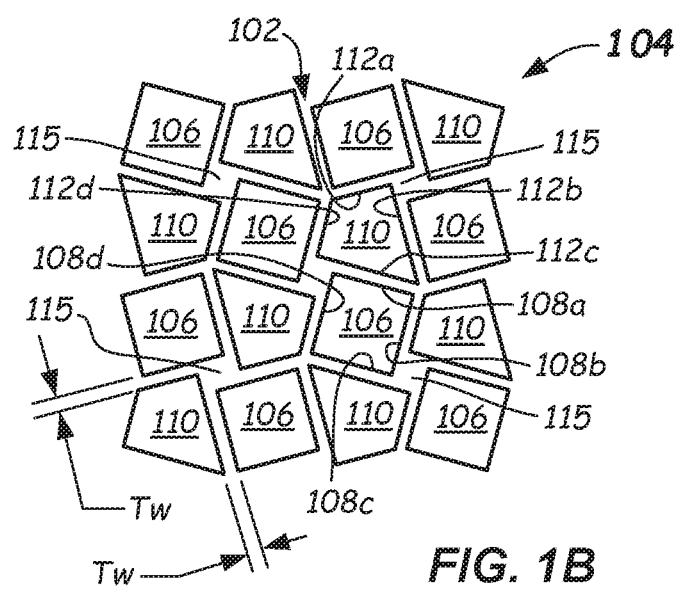
FIG. 1B schematically illustrates an enlarged view of a single repeating channel structure of the honeycomb body of FIG. 1A illustrating the makeup of the repeating channel structure comprising a first and second channel type according to one or more embodiments of the disclosure.
Figure 1C:
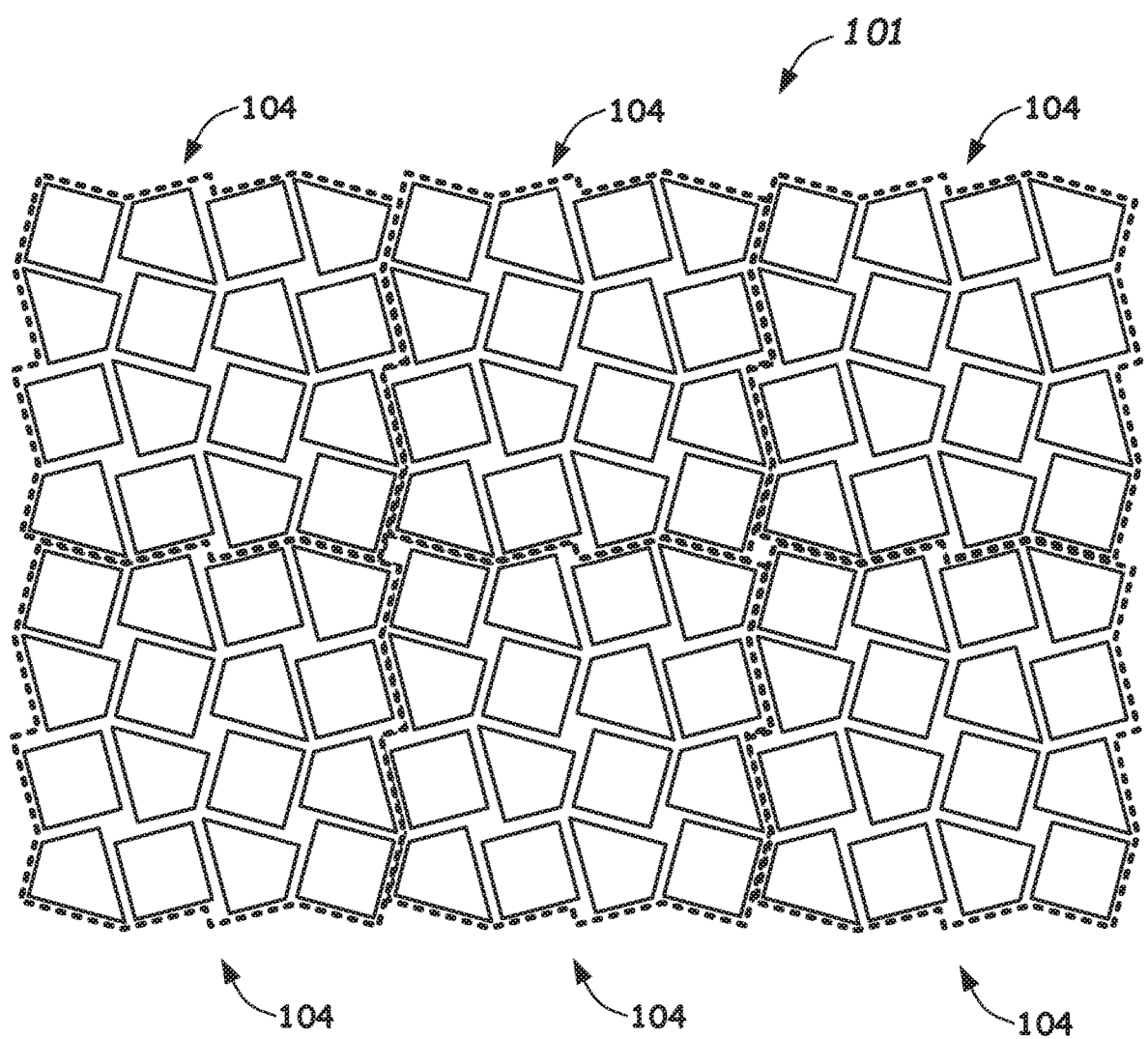
FIG. 1C schematically illustrates a partial inlet end view of a honeycomb matrix of a honeycomb body comprising an arrangement of multiple repeating channel structures according to one or more embodiments of the disclosure.
Figure 1D:
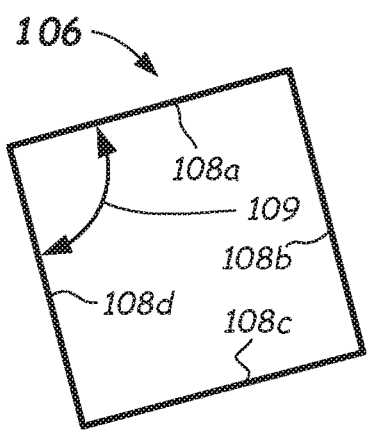
FIG. 1D schematically illustrates one configuration of a first channel type at least partially defined by four first surfaces, wherein at least two of the four first surfaces are parallel to one another according to one or more embodiments of the disclosure.

FIGS. 1A-1B illustrate an inlet end view and an enlarged partial view, respectively, of a first example embodiment of a honeycomb body 100 in accordance with one or more embodiments of the disclosure. The honeycomb body 100 has utility for use as a catalyst substrate, which is used as a vehicle emissions control device that converts toxic byproducts of combustion to less toxic substances by performing catalyzed chemical reactions with a flow stream, such as an engine exhaust stream of an internal combustion engine (e.g., gas or diesel engine). The honeycomb body 100 may, in some embodiments, be coated with an inorganic washcoat, which may be made up of titanium dioxide, aluminum oxide, silicon dioxide, or combinations thereof, for example. Catalytic materials (e.g., as described above) can be suspended in the washcoat before application to the honeycomb body 100. For example, the catalytic materials may be one or more metals, such as platinum, palladium, rhodium, or combinations thereof. Further, in some washcoat compositions cerium, iron, nickel, and manganese may also be included. Other catalyst-containing washcoat compositions may be used. As will be apparent from the following, some embodiments of the honeycomb bodies described herein can comprise plugged channels and this can comprise particulate filters.

The depicted embodiment of honeycomb body 100 described with reference to FIGS. 1A-1F comprises a honeycomb matrix comprising a plurality of intersecting porous walls 102 forming a repeating channel structure 104 (outlined by dotted line in FIG. 1A). The repeating channel structure 104 is a unit that can be arranged in a repeating pattern. The pattern may be repeated across the honeycomb body 100 and in some embodiments, can extend entirely across the honeycomb matrix and out to the skin 105 as shown in FIG. 1A. The skin 105 is an outer-most peripheral portion of the honeycomb body 100, and can be thicker than the walls 102. The skin may be extruded with the matrix of porous walls or can be an after-applied skin and can surround a plurality of the repeating channel structures 104.

The porous walls 102 in this embodiment, intersect with one another and form a plurality of channels that extend longitudinally (e.g., substantially parallel with one another) along an axial flow axis (perpendicular to the X and Y axes shown). The exhaust flow extends from the inlet end 107 shown to an outlet end (not shown in FIGS. 1A-1F) of the honeycomb body 100. The outlet end is opposite the inlet end 107 shown.

As shown, the repeating channel structure 104 comprises a first channel type 106 (a few labeled in FIG. 1A) and a second channel type 110 (a few labeled in FIG. 1A). The first channel type 106 and the second channel type 110 have different shapes in transverse cross-section (within the X-Y plane). The first channel type 106 can have a different cross-sectional area than the second channel type 110. For example, the second channel type 110 can be larger than the first channel type in some embodiments. Optionally, in some embodiments, the first channel type 106 can be larger than the second channel type 110. An area ratio AR of the transverse cross-sectional area A1 of the first channel type 106 to the transverse cross-sectional area A2 of the second channel type 110 can range from 0.5 to 2.0, or even from 0.75 to 1.50, or even from 0.5 and 1.0, for example. Below 0.5 and above 2.0 the walls 102 become quite thick, which is undesirable from a back pressure standpoint. The area ratio AR is given by equation 1 below:

$$AR=A1/A2 \qquad \text{Eqn. 1}$$

Figure 1E:
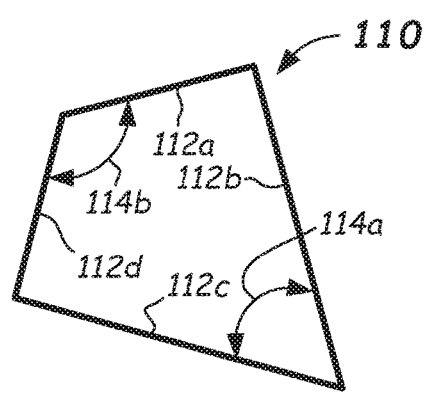
FIG. 1E schematically illustrates one configuration of second channel type defined by at least four second surfaces, wherein four or more of the at least four second surfaces are non-parallel with one another according to one or more embodiments of the disclosure.

In more detail, the first channel type 106 is at least partially defined by four first surfaces 108a-108d, at least two of the four first surfaces 108a-108d are parallel to one another. The four first surfaces 108 of the first channel type 106 can comprise two pairs of opposing parallel surfaces. For example, a first pair of surfaces (e.g., first surfaces 108a and 108c) can be parallel with one another. Likewise a second pair of first surfaces (e.g., surfaces 108b, 108d) can be parallel with one another. The first surfaces 108a-108d can comprise planar surfaces. Each adjoining first surface 108a, 108d can comprise a corner angle 109 of approximately 90 degrees. Thus, in one embodiment, where all surfaces 108a-108d are of equal length as measured along the surface in the X-Y plane, the first channel type 108 can comprise a square in transverse cross-section. Optionally, as shown in FIG. 1G, the first channel type 108 can comprise a rectangle wherein the first pair of first surfaces (e.g., first surfaces 108a and 108c) are shorter than the second pair of the first surfaces (e.g., 108b and 108d).

Figure 1F:
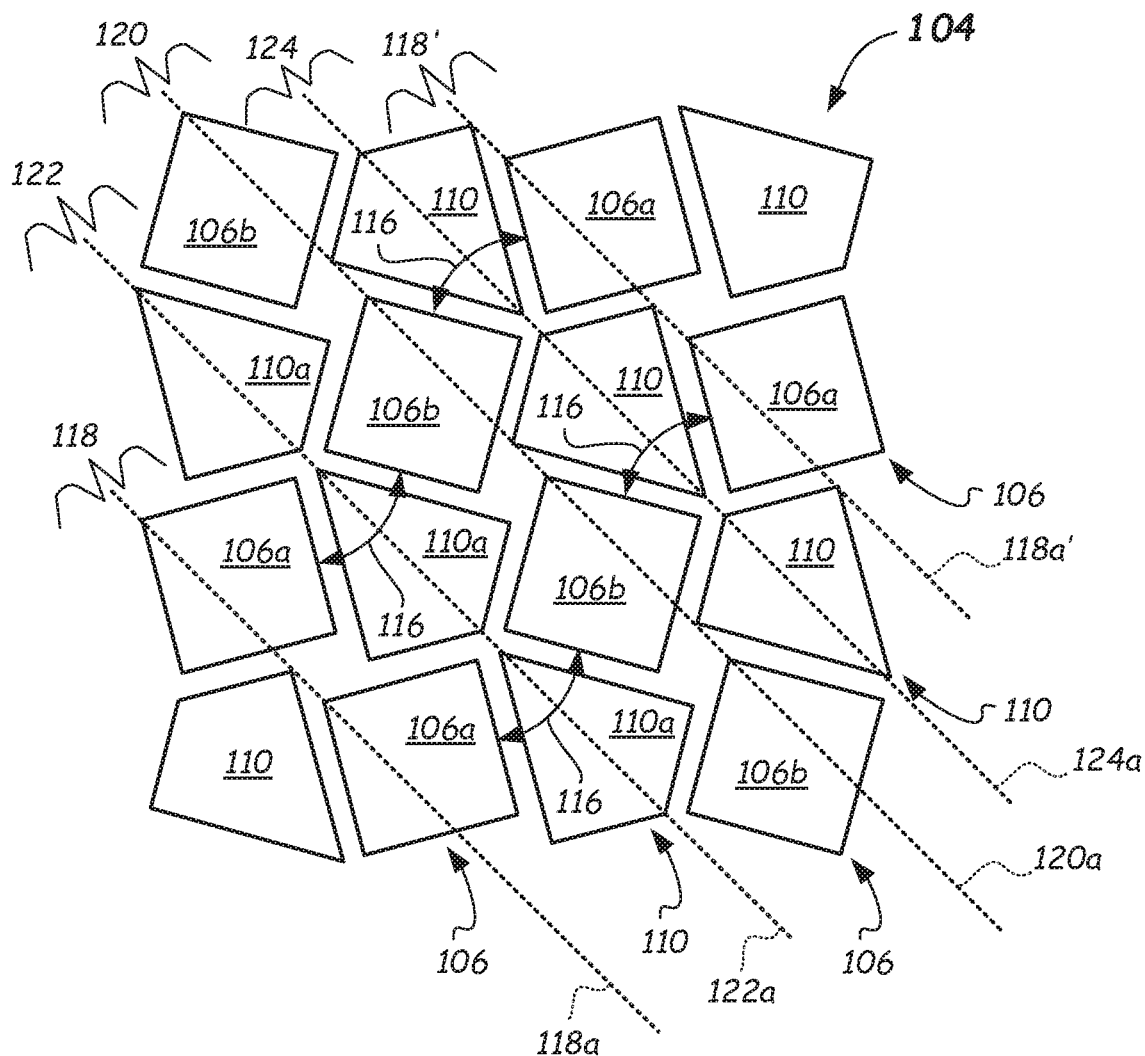
FIG. 1F schematically illustrates an alignment of, and relative tilt of, the first and second channel types of the repeating channel structure according to one or more embodiments of the disclosure.
Figure 1G:
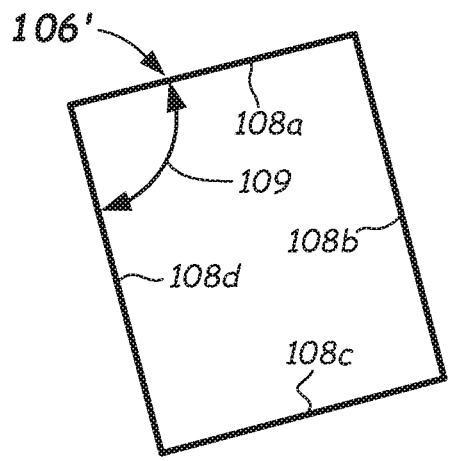
FIG. 1G schematically illustrates another configuration of a first channel type comprising a rectangle another according to one or more embodiments of the disclosure.
Figure 1H:
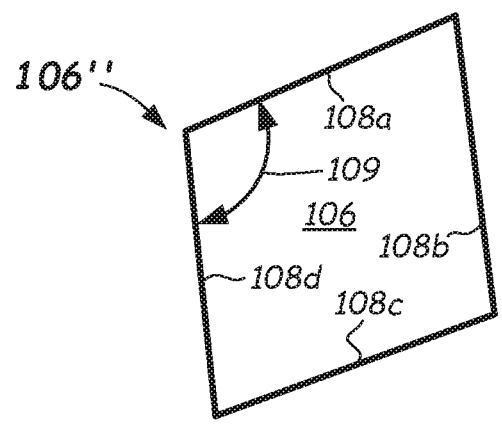
FIG. 1H schematically illustrates another configuration of a first channel type comprising a parallelogram another according to one or more embodiments of the disclosure.

However, the first channel type 106 may optionally be a parallelogram as shown in FIG. 1H with the corner angle 109 being other than 90 degrees. For example, the corner angle 109 can range from greater than 90 degrees to 65 degrees.

The second channel type 110 can comprise at least four second surfaces 112a-112d. As shown in FIGS. 1A-1F, the second channel type 110 can comprise a polygon with four and only four second surfaces 112a-112d. Four or more (at least four) of the at least four second surfaces 112a-112d are non-parallel with one another. The second channel type 110 comprises a quadrilateral whose four second surfaces 112a-112d can be grouped into two pairs of equal-length surfaces. In the depicted embodiment, the second channel type 110 comprises a four-sided irregular concave polygon, which comprises the shape of a kite. Thus, the embodiment of FIGS. 1A-1F can be referred to as a kite-square channel configuration. Referring to FIG. 1E, the kite-square channel configuration comprises a first corner comprising a first corner angle that is an acute included angle 114a (<90 degrees) and a second corner angle that is an obtuse included angle 114b (>90 degrees).

In particular, a first pair 112b, 112c of the two pairs of equal-length surfaces diverge from one another and comprise the acute included angle 114a there between. A second pair 112a, 112d of the two pairs of equal-length surfaces diverge from one another and comprise an obtuse included angle 114b there between. First corner angle 114a can range from 45 degrees to 65 degrees, or even 55 degrees to 75 degrees in some embodiments, for example. Second corner angle 114b can range from 100 degrees to 135 degrees, or even 110 degrees to 125 degrees in some embodiments, for example. In the depicted embodiment, the first pair 112b, 112c of the two pairs of equal-length surfaces can be longer than a second pair 112a, 112d of the two pairs of equal-length surfaces. Other non-equal length surface embodiments are possible.

Referring now to FIG. 1F, another feature, namely a tilted channel configuration, is shown and described. The honeycomb body 100 comprising the repeating channel structure 104 further comprises a first channel 106a of the first channel type 106 that comprises an orientation that is tilted by a first non-zero tilt angle 116 relative to a second channel 106b of the first channel type 106. The first non-zero tilt angle 116 is measured between directly closest surfaces of the first channel 106a and the second channel 106b, as shown in FIG. 1F. The first channel 106a can comprise part of a first subgroup 116 of the first channel type 106 wherein each of the first channels 106a of the first subgroup 116 are arranged along a straight line, such as first line 116a. The first non-zero tilt angle 116 can be made to substantially match the first corner angle 114a, thus the first non-zero tilt angle 116 can range from 45 degrees to 80 degrees. In some embodiments, the first non-zero tilt angle 116 can range from 55 degrees to 70 degrees. Providing the non-zero tilt angle 116 equal to the first corner angle 114a can provide substantially constant thickness of the walls 102 in the transverse cross-section.

The repeating channel structure 104 can further comprise a second subgroup 120 of the first channel type 106 wherein each of the channels 106b of the second subgroup 120 are arranged along a second line 120a. Moreover, the repeating channel structure 104 can further comprise a third subgroup 122 of the second channel type 110 wherein each of the channels 110a of the third subgroup 122 of the second channel type 110 are arranged along a third line 122a. First channel type 106 and the first subgroup 120 of the first channel type 106.

The repeating channel structure 104 can further comprise a fourth subgroup 124 of the second channel type 110 wherein each of the channels 110b of the fourth subgroup 124 of the second channel type 110 are arranged along a fourth line 124a, wherein the channels 110b of the fourth subgroup 124 of the second channel type 110 are provided in a different orientation than the channels 110a of the third subgroup 122. In particular, the channels 110b of fourth subgroup 124 of the second channel type 110 can be rotated approximately 180 degrees (as shown) from the orientation of the channels 110a of the third subgroup 122 of the second channel type 110.

In the depicted embodiment, the first subgroup 118 of the first channel type 106 and the second subgroup 120 of the first channel type 106 are interspersed by the third subgroup 122 of the second channel type 110. Likewise, another first subgroup 118' of the first channel type 106 and the second subgroup 120 of the first channel type 106 are interspersed by the fourth subgroup 124 of the second channel type 110. Each of the channels 106a of the other subgroup 118' of the first channel type 106 can be arranged along a fifth line 118a'.

Each of the first line 118a and second line 120a of the first subgroup 118 and the second subgroup 120, respectively, may arranged in parallel to one another. Likewise, each of the third line 122a and fourth line 124a of the third subgroup 118 and the fourth subgroup 120, respectively, may arranged in parallel to one another. Moreover, the first line 118a and fifth line 118a' of the first subgroup 118 and the other first subgroup 118', respectively, may arranged in parallel to one another.

Figure 1I:
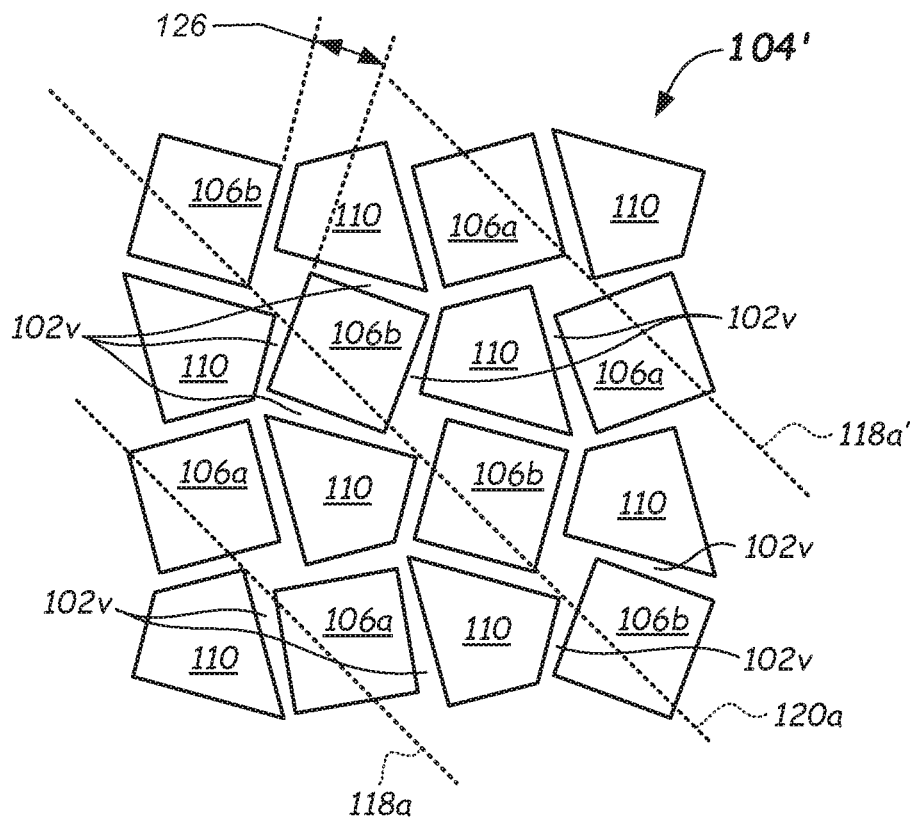
FIG. 1I schematically illustrates an alternative configuration of the repeating channel structure wherein some of the first channel type are tilted relative to others of the first channel type that are arranged in a same row according to one or more embodiments of the disclosure.

In an alternative embodiment as illustrated in FIG. 1I, the first channel type 106a and/or 106b arranged along the first line 118a, second line 120a, and fifth line 118', respectively, may be tilted relative to each other along one or more of the first line 118a, second line 120a, and fifth line 118'. For example, comparing the first channel type 110b along second line 120a, alternating ones of the channels 106b can be tilted relative to one another, thus resulting in some wall thickness 102V that are non-constant in wall thickness, such as walls 102V shown and labeled. The amount of relative tilt between respective ones of the first channel type 106b arranged along the second line 120a can be a tilt angle 126 of ranging from 1 degrees to 10 degrees, for example. This may have some benefit in terms of lowering backpressure under certain conditions, for example.

Figure 5A:
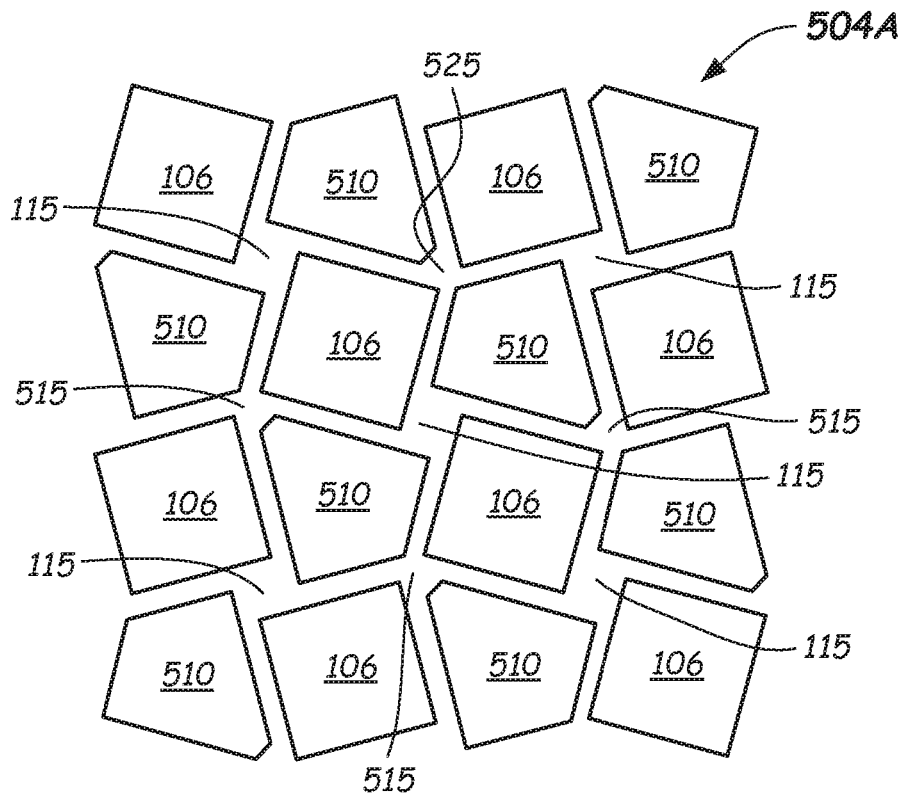
FIG. 5A schematically illustrates another alternative configuration of the repeating channel structure wherein the channels of the second channel type comprise five sides (e.g., an irregular concave pentagon) according to one or more embodiments of the disclosure.

As shown in FIG. 5A, the repeating channel structure 504A can comprise a second channel type 510 that comprises more than four surfaces. For example, the second channel type 510 can comprise a polygon with five surfaces. This configuration can allow for less catalyst pooling in the acute-angled corner and can provide a stronger honeycomb body by providing second reinforcing regions 515, 525 disbursed within the matrix in addition to first reinforcing regions 115. In particular, the shape of the second channel type 510 can comprise an irregular convex pentagon, such as shown.

FIG. 5B illustrates a repeating channel structure 504B that can comprise six surfaces. For example, the second channel type 510B comprises a polygon with 6 surfaces. In particular, the shape of the second channel type 510B can comprise an irregular convex hexagon, such as shown.

FIGS. 5C and 5D illustrate second channel types 510C, 510D that comprise polygons with 7 surfaces and 8 surfaces, respectfully. In particular, the shape of the second channel type 510C can comprise an irregular convex heptagon, such as shown. The shape of the second channel type 510D can comprise an irregular convex octagon, such as shown.

Otherwise, the configuration of the repeating channel structure 504A, 504B and repeating channel structures comprising second channel type 510C, 510D are the same as described herein. In each case, second channel types 110, and 510A-510D can be symmetrical or asymmetrical. Each of the surfaces may be of different length, including those on either side of a line bi-furcating the included angles 114a, 114B.

Figure 2:
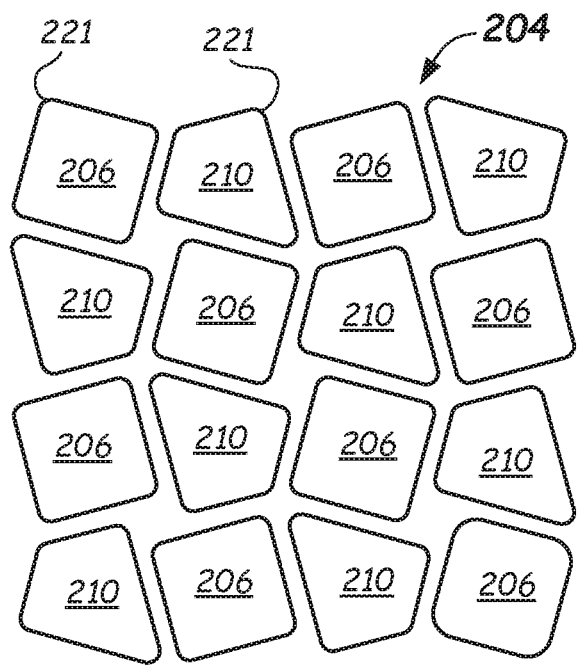
FIG. 2 illustrates an alternative configuration of the repeating channel structure comprising radiuses in the corners of the first and second channel types according to one or more embodiments of the disclosure.

As shown in FIG. 2, one or more of the corners of the first and/or second channel types 206, 210, respectively, of the repeating channel structure 204 can comprise a corner angle treatment 221 configured to lessen a severity of the corner. The corner angle treatment 221 can comprise corner radiusing, chamfering, and the like. This corner angle treatment 221 can aid in reducing washcoat pooling therein by making the corners less sharp, and can further increase strength of the honeycomb bodies comprising the corner angle treatment 221. For example, in some embodiments, the corner treatment 220 can comprise a corner radius as shown. The corner radius can be up to about 10% of the maximum transverse dimension across the particular channel type 206, 210, for example. Too large of a corner angle treatment 221 can thicken the walls 102 undesirably.

Figure 3A:
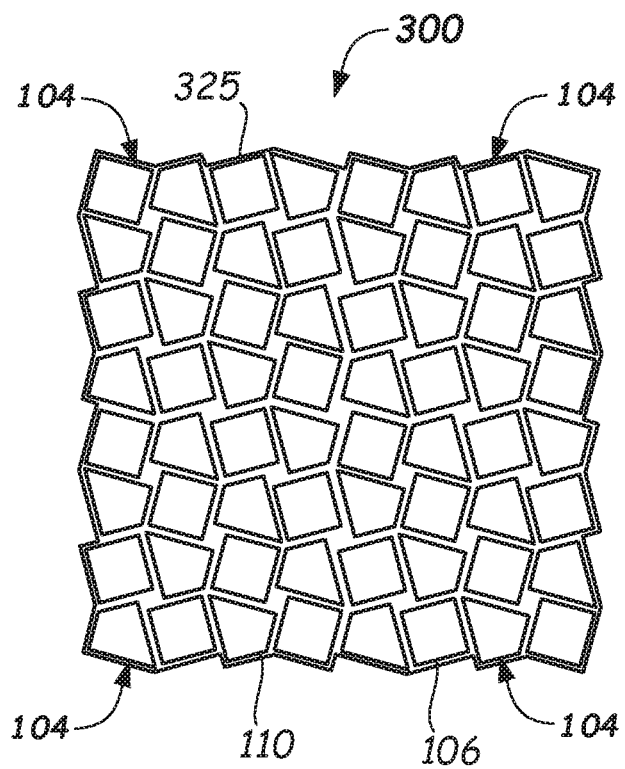
FIG. 3A schematically illustrates an alternative configuration of a honeycomb body comprising the repeating channel structure provided as a segment according to one or more embodiments of the disclosure.
Figure 3B:
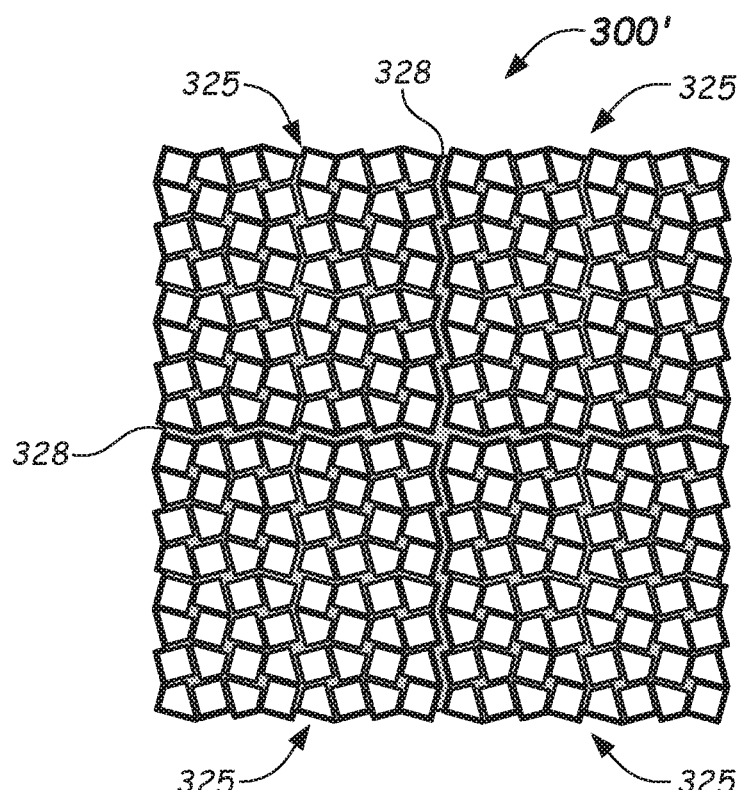
FIG. 3B schematically illustrates a configuration of a segmented honeycomb body comprising the repeating channel structure and provided as an assembly of multiple segments of FIG. 3A according to one or more embodiments of the disclosure.

FIG. 3A illustrates repeating channel structures 104 that are embodied within a honeycomb body 300 as a segment 325. Multiple segments 325 can be assembled into a segmented honeycomb body 300' as shown in FIG. 3B. In this embodiment, the four repeating channel structures 104 (a 2×2 orientation) each comprising first and/or second channel types 106, 110, respectively, are provided within the segment 325. However other multiple numbers of repeating channel structures 104 may be included within the segment 325, such as 9 (3×3), 16 (4×4), 25 (5×5), for example. Other orientations comprising combinations of different numbers of rows and columns are possible. The segment 325 may optionally be made up of other configurations of first and/or second channel types, as described herein.

After firing, various numbers of segments 325 can be assembled by any suitable means, such as by providing cement layers 328 between the respective segments 325 thus boding them together. Arrangements of 2×2 segments (as shown), 3×3 segments, 4×4 segments, 5×5 segments, or other arrangement s comprising different numbers of rows and columns of segments 325 may be used. Cement layers 328 can comprise an inorganic particle-containing paste, which is dried and/or can be partially sintered to bind the segments 325 together. Suitable cements can be as described in U.S. Pat. Nos. 9,834,481, 9,828,298, US 2018/0001517, US 2009/0239030, US 2006/0051556, US 2005/0079975, and WO 2009/017642, for example. Other suitable inorganic cements can be used.

Figures 3C, 4:
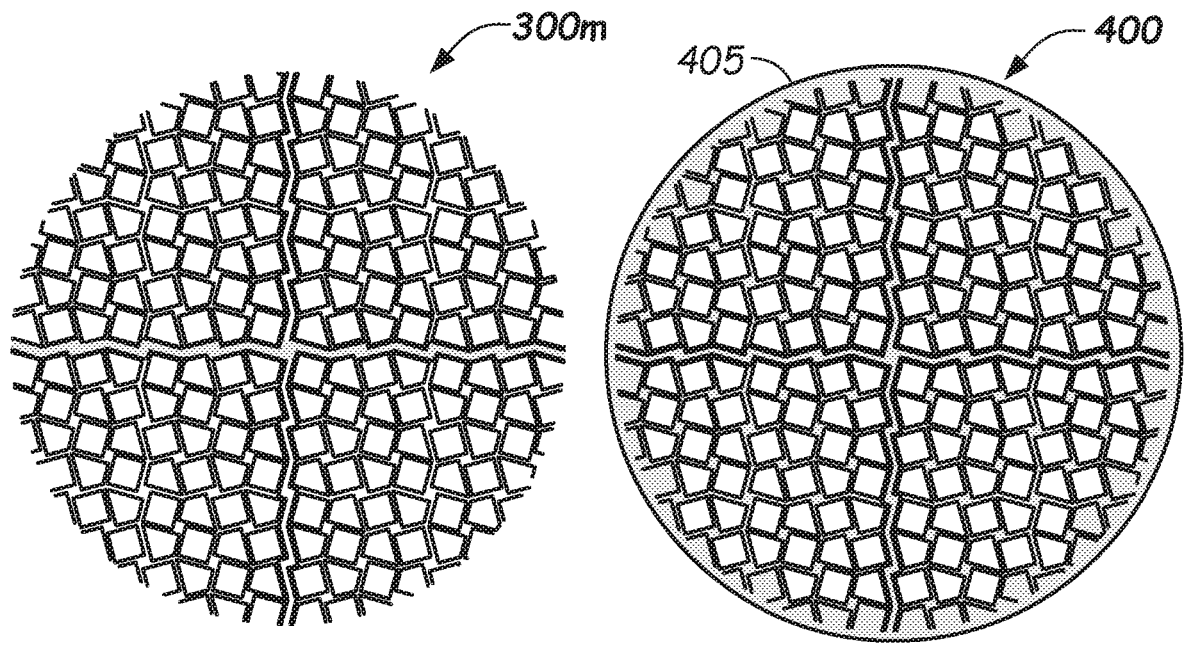
FIG. 3C schematically illustrates a configuration of a machined segmented honeycomb body comprising the repeating channel structure wherein an outer portion of the assembly of multiple segments of FIG. 3B according to one or more embodiments of the disclosure.
FIG. 4 schematically illustrates a configuration of a skinned segmented honeycomb body comprising the repeating channel structure wherein an after-applied skin is affixed to a periphery of the machined honeycomb body of FIG. 3C according to one or more embodiments of the disclosure.

Once the segments 325 are cemented together, the collection of segments 325 containing the repeating channel structures 104 of the honeycomb body 300' may be machined by any suitable machining method to a near final shape by removing portions of the segments 325 as shown in FIG. 3C. This can result in some incomplete repeating channel structures around the periphery of the machined honeycomb body 300m. Machining can be by any suitable method, such as cutting, milling, grinding, standing, or combinations thereof.

Following machining, and as best shown in FIG. 4, a peripheral skin 405 can be applied by any suitable skinning method to form a skinned honeycomb body 400. Peripheral skin 405 can be made of the same cement as used to assemble the segments 325 or different skin cement may be used. Skinning methods and skins may be as described in U.S. Pat. Nos. 8,617,659, 9,809,992, 9,833,927, 9,862,650, 9,789,633, 9,132,578, 9,067,831, for example. This type of after-applied peripheral skin 405 may be applied to non-segmented honeycombs, such as described herein as well.

Figure 5E:
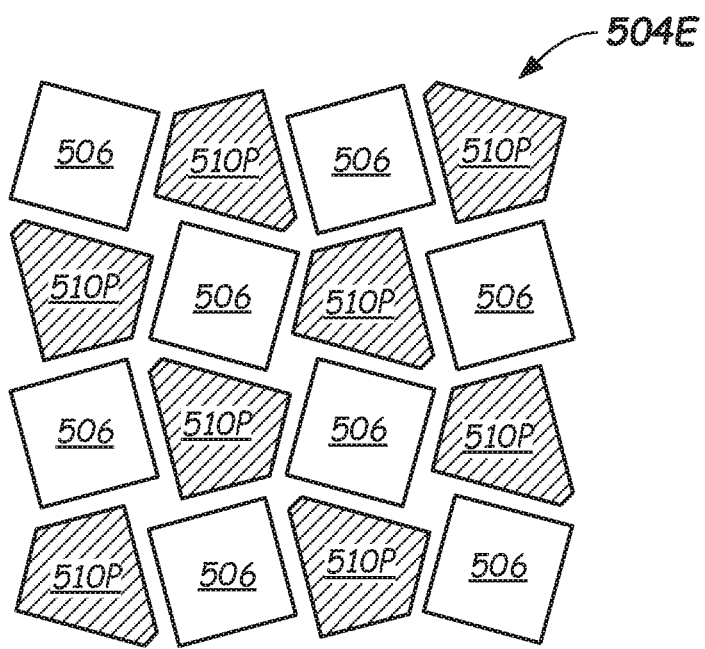
FIG. 5E schematically illustrates an alternative configuration of a repeating channel structure wherein all the channels of the first channel type of the repeating channel structure are plugged proximate one end, such as at or near the outlet end and the channels of the second channel type are open (unplugged, flow through) channels according to one or more embodiments of the disclosure.
Figure 5F:
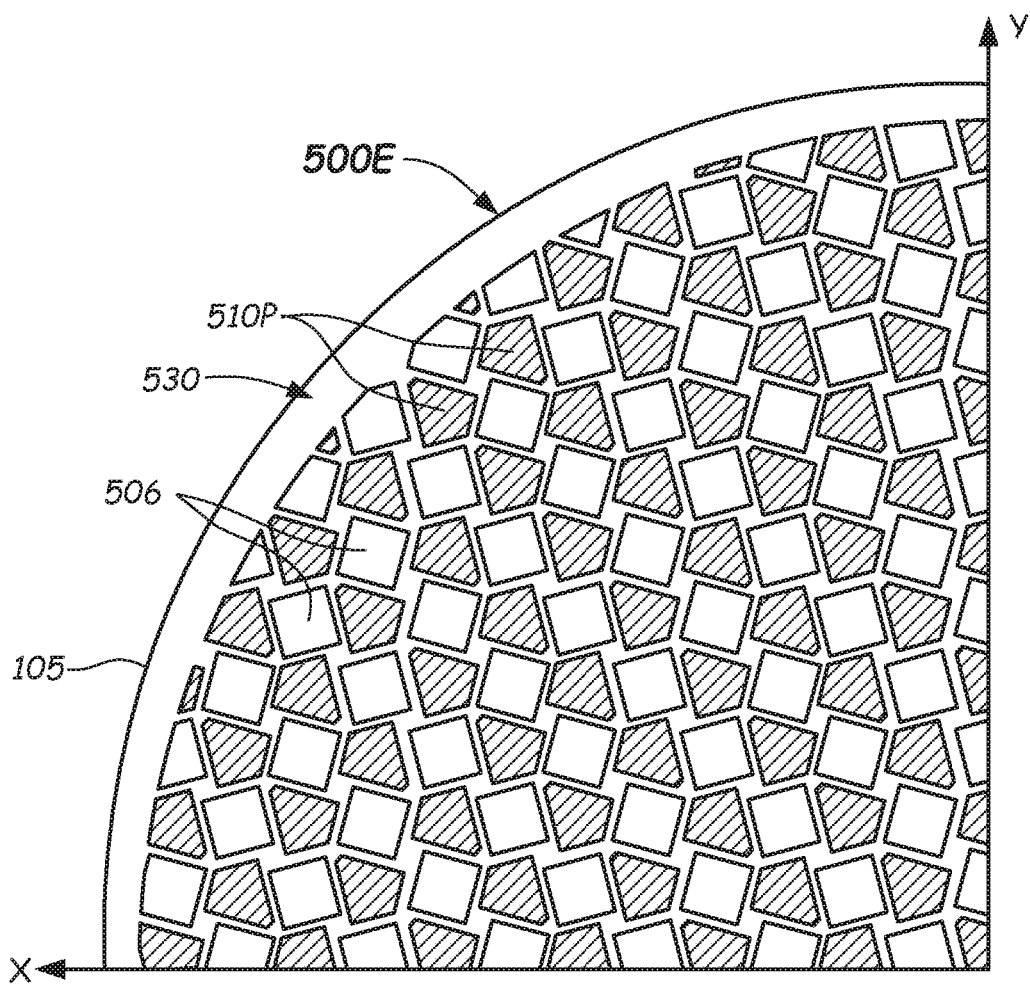
FIG. 5F schematically illustrates a quarter of honeycomb body comprising the repeating channel structure of FIG. 5E according to one or more embodiments of the disclosure (the other quarters being mirror images thereof).

As best shown in FIGS. 5E and 5F, in some embodiments, the repeating channel structure 504E comprises some plugged channels. For example, the plugged channels can comprise channels of the second channel type 510P. The second channel type 510P can be plugged proximate one end, such as at or near the outlet end 530, such as shown in FIG. 5F. The channels of the first channel type 506 can be unplugged flow through channels, i.e., that are unplugged along the length thereof. In the depicted embodiment, all of the channels of the second channel type 510P in the repeating channel structure 504E are plugged. This plugging pattern can be provided throughout the outlet face at the outlet end 530 of the plugged honeycomb body 500P as shown in FIG. 5F (a quarter of the outlet face shown). For example, a honeycomb body 100 of FIG. 1 can be manufactured/fired and then plugged by any suitable plugging method to form the plugged honeycomb body 500E. Optionally, channels of the first channel type 106 could be the plugged channels (e.g., plugged at the outlet end) and the channels of the second channel type 110 can be unplugged flow through channels. Moreover, in some embodiments, both the channels of the first channel type 106 and channels of the second channel type 110 could be plugged channels wherein the channels of the first channel type 106 can be plugged at the inlet end (are outlet channels) and the channels of the second channel type 110 can be plugged at the outlet end (are inlet channels).

Figure 5G:
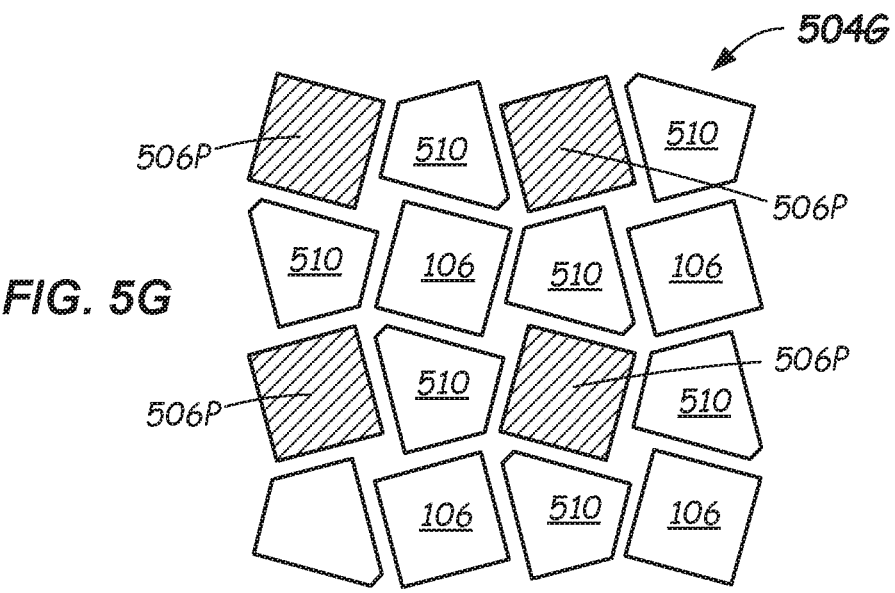
FIG. 5G schematically illustrates an alternative configuration of a repeating channel structure wherein only some (not all) of the channels of the first channel type are plugged, such as at or near the outlet end and the channels of the second channel type are open (unplugged, flow through) channels according to one or more embodiments of the disclosure.
Figure 5H:
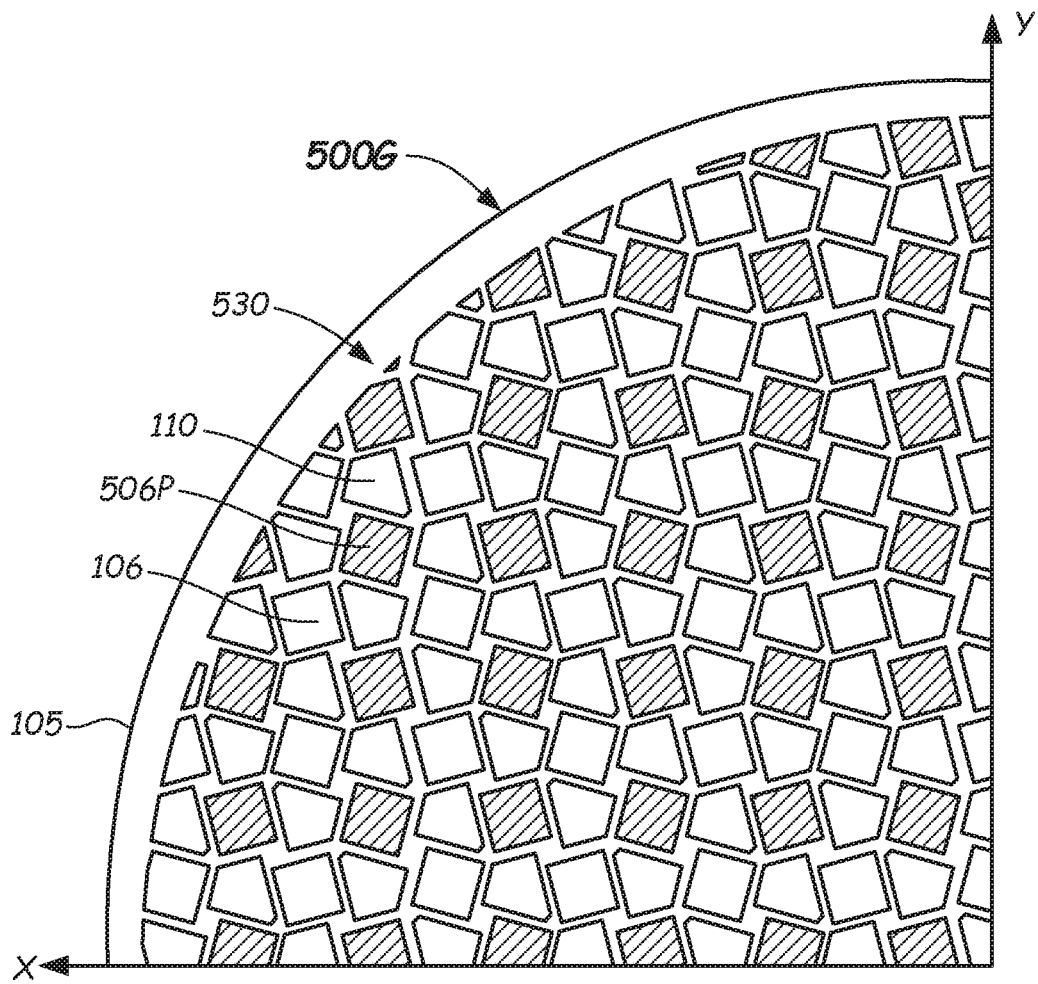
FIG. 5H schematically illustrates a quarter of honeycomb body comprising the repeating channel structure of FIG. 5G according to one or more embodiments of the disclosure (the other quarters being mirror images thereof).

In FIGS. 5G and 5H, the repeating channel structure 504G can comprise less than 50% plugged channels. For example, the plugged channels can comprise some channels of the first channel type 506P and some unplugged channels of the first channel type 106. The first channel type 506P can be plugged proximate one end, such as at or near the outlet end 530, such as shown in FIG. 5H. The channels of the second channel type 110 can be unplugged flow through channels. In the depicted embodiment, some of the channels of the first channel type 106 in the repeating channel structure 504G are unplugged, while other channels of the first type 506P are plugged. This plugging pattern can be provided throughout the outlet face at the outlet end 530 of the plugged honeycomb body 500G as shown in FIG. 5H (a quarter of the outlet face shown). For example, a honeycomb body 100 of FIG. 1 can be manufactured and then plugged to form the plugged honeycomb body 500H. Optionally, channels of the second channel type 110 could have some of the channels plugged (e.g., plugged at the outlet end) and others unplugged, wherein the channels of the first channel type 106 can be unplugged flow through channels.

In each of the above embodiments, the skin 105 may be formed as an extruded skin or an after-applied skin, i.e., applied as ceramic-based skin cement onto an outer periphery (e.g., a machined outer periphery) of a fired ceramic honeycomb body. The skin 105 may comprise a skin thickness Ts (FIG. 1A) that can be substantially uniform about the radial periphery of the honeycomb body 100, for example. The skin thickness Ts may range from 0.1 mm to 100 mm, or even between 0.1 mm to 10 mm, for example. Other skin thicknesses Ts may be used.

In some embodiments, the transverse thickness Tw (FIG. 1B) of the porous walls 102 may range from 0.002 inch (0.051 mm) to 0.01 inch (0.254 mm). The transverse cross-sectional area of each of the first channel type 106 and second channel type 110 of the repeating channel structure 104 may be constant along an entire length of the honeycomb body 100. Moreover, a transverse wall thicknesses Tw of the porous walls 102 may be constant along an axial length (Z axis—perpendicular to X and Y axes) of the honeycomb body 100.

Furthermore, the honeycomb body 100 can comprise a channel density CD (otherwise referred to "cell density") wherein CD≥200 channels per square inch (cpsi) (31.0 channels/cm$^2$). However, in other embodiments, such as in particulate filter applications including plugged honeycomb bodies 500E, 500G, and the like, CD may be greater than or equal to 200 cpsi (31.0 channels/cm$^2$) and less than or equal to 400 cpsi (62.0 channels/cm$^2$). In non-filter applications (i.e., flow through substrate applications such as catalytic converters) including honeycomb bodies 100, 300', 400, etc. CD may be greater than or equal to 400 cpsi (62.0 channels/cm$^2$) and less than or equal to 900 cpsi (279.0 channels/cm$^2$).

In the embodiments described herein, the porous walls 102 of the honeycomb bodies 100, etc. described herein may comprise open, interconnected porosity and may be manufactured of a porous ceramic material or other suitable porous material that can withstand high temperatures in use, such as those encountered when used in engine exhaust after-treatment applications. For example, the intersecting porous walls 102 may be made of a ceramic material, such as cordierite, aluminum titanate, mullite, a combination of cordierite, mullite and aluminum titanate (CMAT), alumina ($Al_2O_3$), silicon carbide (SiC), silicon aluminum oxynitride ($Al_6O_2N_6Si$), zeolite, combinations of the afore-mentioned, and the like. Other suitable porous materials may be used, such as porous metal.

Each of the described repeating channel structures described herein may be provided in a honeycomb body, and the outermost cross-sectional shape of the honeycomb body may be of any desired shape, such as a circle (as shown in FIGS. 1A, 4, 5F and 5H), an ellipse, an oval, triangular or tri-lobed, a racetrack, a square, a rectangular (non-square), a pentagon, hexagon, heptagon, an octagon, combinations of the afore-mentioned, or other suitable polygonal shape. Other outer peripheral cross-sectional shapes may be used.

Embodiments of the honeycomb bodies comprising the repeating channel structures 104, etc. described herein may comprise certain microstructural properties, which in combination with the repeating channel structure configuration may provide for a combination of relatively-low pressure drop, and/or fast light-off, and the like.

For example, the open and interconnected average bulk porosity (hereinafter "% P") of the porous walls 102, after firing, may be % P≥25%, % P≥30%, % P≥35%, P %≥40%, P %≥45%, P %≥50%, P %≥55%, % P≥60%, or even % P≥65%, in some embodiments. In some embodiments, the open and interconnected average bulk porosity of the intersecting porous walls 102 may be 20%≤% P≤75%, or even 25%≤% P≤70%, or even 30%≤% P≤70%.

The porous walls 102, after firing, may comprise a median pore diameter ($D_{50}$) of 6 μm≤$D_{50}$≤20 μm in some embodiments. The d-factor (df) of the pore size distribution of the open, interconnected average bulk porosity may be df≤0.50, or even df≤0.40, or even df≤0.30, or even df≤0.20, and 0.16≤df≤0.50, wherein df=(($D_{50}$−$D_{10}$)/$D_{50}$), wherein $D_{10}$ is a diameter in the pore size distribution of the porous walls 102 where 10% of the pores have an equal or smaller diameter and 90% have a larger diameter. The average bulk porosity % P, median pore diameter $D_{50}$, $D_{10}$, and df of the pore size distribution may be measured by mercury porosimetry, for example.

In low-porosity, flow through honeycomb bodies (e.g., honeycomb bodies 100, 300, 400, etc.), the porous walls 102, after firing, may comprise an average bulk porosity that ranges from 35%≤% P≤55%, a median pore diameter ($D_{50}$) of 13 μm≤$D_{50}$≤20 μm, and df of the pore size distribution of the open, interconnected porosity may be 0.35≤df≤0.65.

For high-porosity, plugged honeycomb bodies 500E, 500G, the open and interconnected porosity (% P) of the porous walls 102, after firing, may comprise a porosity that ranges from 40%≤% P≤70%, and comprise a median pore diameter ($D_{50}$) of 9 μm≤$D_{50}$≤18 μm in some embodiments, and df of the pore size distribution of the open, interconnected porosity may be 0.20≤df≤0.45.

The above described % P, dB, $D_{50}$, and CD may be combined in any combination with each other and with the repeating channel structures 104, etc. described herein.

Figure 6:
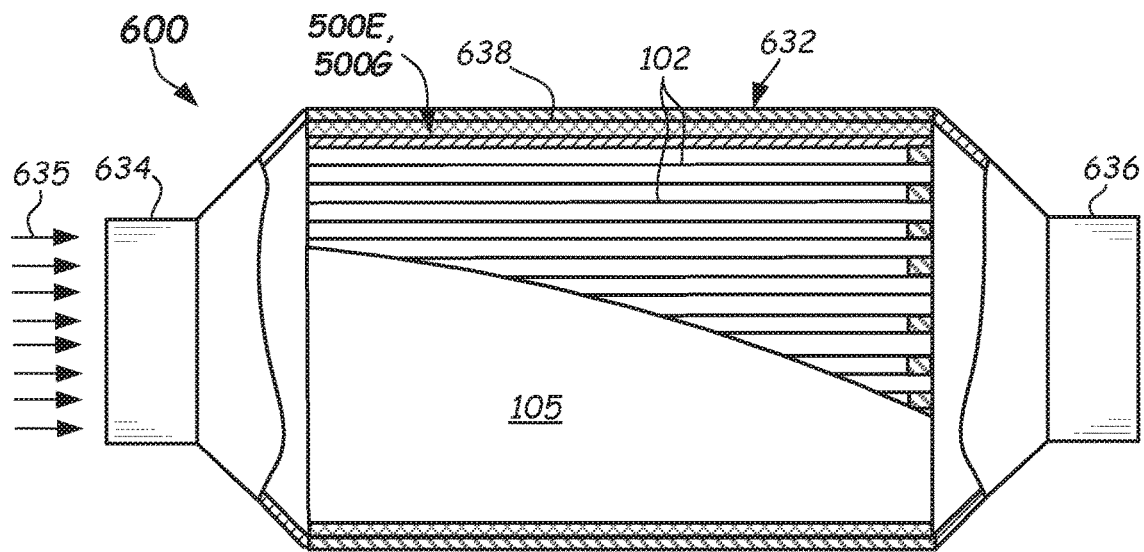
FIG. 6 schematically illustrates a particulate filter comprising a honeycomb body comprising the repeating channel structure wherein some of the channels of the first channel type are plugged, such as at or near the outlet end and the channels of the second channel type are open (unplugged, flow through) channels according to one or more embodiments of the disclosure.

Referring now to FIG. 6, a particulate filter 600 comprising a honeycomb body (e.g., 500E, 500G, etc.) of FIGS. 5F, 5H, is shown. Optionally, honeycomb bodies comprising any one of repeating channel structures described herein may be used. In the depicted embodiment, the plugged honeycomb body 500E, 500G is received inside of a can 632, such as a metal housing or other rigid confining structure. Can 632 may comprise a first end cap comprising an inlet 634 configured to receive engine exhaust flow 635 therein, and a second end cap comprising an outlet 636 configured to exhaust a gas flow. A percentage of an undesirable component (e.g., particulates, soot, NOx, CO, HC, and/or SOx) in the engine exhaust flow 635 can be reduced by passing through the plugged honeycomb body 500E, 500G. In catalyzed filters, interaction with catalyst provided on and/or in the porous walls 102 can reduce undesirable species (e.g., NOx, CO, HC, and/or SOx) in the exhaust flow. Likewise soot and other particulates can be trapped on or in the walls 102 in such particulate filters 600. The skin 105 of the honeycomb body 500E, 500G may have a cushioning member 638 in contact therewith, such as a high-temperature insulation material, to cushion the honeycomb body 500E, 500G from shock and stress. Any suitable construction of the member 638 may be used, such as one-layer construction, or two or more layer construction. The honeycomb body 500E, 500G and cushioning member 638 may be received in the can 632 by any suitable means, such as by funneling into the central body of the can 632 and then one or more of the first and second end caps may be secured (e.g., welded) onto the central body for form the inlet 634 and the outlet 636. Other, two-piece construction or clam-shell construction of the can 632 can be optionally used.

Optionally, a catalytic converter 745 (see FIG. 7A) can be manufactured in the same manner by including the honeycomb body 100, etc. including a suitable catalyst-containing washcoat on or in the walls 102 thereof within the can 632. The catalytic converter 745 can comprise a wholly unplugged honeycomb body 100.

Figure 7:
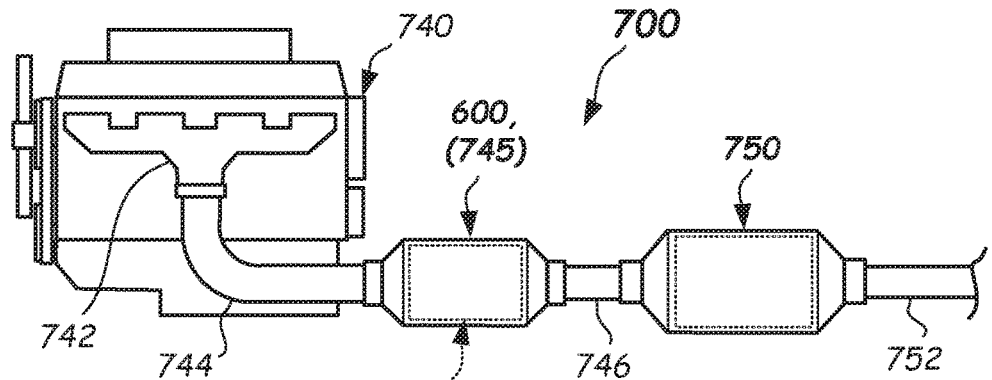
FIG. 7 schematically illustrates a particulate filter or a catalytic converter comprising a honeycomb body comprising the repeating channel structure installed in an exhaust system of an internal combustion engine according to one or more embodiments of the disclosure.

FIG. 7 illustrates a first example of an exhaust system 700 coupled to an engine 740 (e.g., a gasoline engine or diesel internal combustion engine). The exhaust system 700 may comprise a manifold 742 configured for coupling to the exhaust ports of the engine 740, a first collection tube 744 configured to couple between the manifold 742 and a particulate filter 600 comprising the plugged honeycomb body 500E, 500E (shown dotted), or, optionally, a catalytic converter 745 containing the honeycomb body 100 (shown dotted).

Coupling may be by any suitable clamping bracket or other attachment mechanism, such as welding. Furthermore, the first collection tube 744 may be integral with the manifold 742 in some embodiments. Moreover, in some embodiments, the particulate filter 600 (or catalytic converter 745) can couple directly to the manifold 742 without an intervening member. The exhaust system 700 may further comprise a second collection tube 746 coupled to the particulate filter 600 (or catalytic converter 745) and to a second exhaust component 750. The second exhaust component 750 in this embodiment can be a particulate filter having all the channels plugged or optionally only some plugged, or may be a muffler. In some embodiments, the second exhaust component 750 may be a particulate filter comprising the same honeycomb body 500E, 500G as described in FIGS. 5E and 5G above, or different type of particulate filter, for example. In some embodiments, the second exhaust component 750 can be a fully-plugged honeycomb body wherein all channels are plugged, such as 50% on the inlet end and 50% on the outlet end. The fully-plugged honeycomb body may comprise an asymmetric channel structure wherein the inlet channels are larger in hydraulic area than the outlet channels.

A tailpipe 752 (shown truncated) or other flow conduit may be coupled to the second exhaust component 750. Other exhaust system components may be included, such as other catalytic converters, particulate filters, oxygen sensors, ports for urea injection, and the like (not shown). In some embodiments, the engine 740 may comprise one plugged filters 600 or catalytic converter 745 for each bank (side set of cylinders) of the engine 740 in which case the second collection tube 746 may be a Y-tube, or optionally, the first collection tube 744 may be a Y-tube collecting exhaust flow from each bank and directing the flow to the plugged filter 600 or catalytic converter 745.

Now referring now to FIGS. 8A-8D, an extruder 800 and example honeycomb extrusion die 855 configured to manufacture the honeycomb body 100 or optionally honeycomb bodies comprising any one of repeating channel structures 104, 204, 304 is provided. The honeycomb body 100, etc. may be formed by extrusion of a plasticized batch, which is described, for example, in U.S. Pat. Nos. 3,885,977, 5,332,703, 6,391,813, 7,017,278, 8,974,724, WO2014/046912, and WO2008/066765, through the honeycomb extrusion die 855 of FIG. 8A-8D to manufacture a green honeycomb body 100G.

The green honeycomb body 100G may then be dried, such as described in U.S. Pat. Nos. 9,038,284, 9,335,093, 7,596,885, or U.S. Pat. No. 6,259,078, for example, to produce a dried green honeycomb body. The dried green honeycomb body may then be fired, such as described in U.S. Pat. Nos. 9,452,578, 9,446,560, 9,005,517, 8,974,724, 6,541,407, or U.S. Pat. No. 6,221,308 to form the honeycomb body 100 or any other honeycomb body comprising repeating channel structures 104, etc. Other suitable forming, drying, and/or firing methods may be used.

Figure 8A:
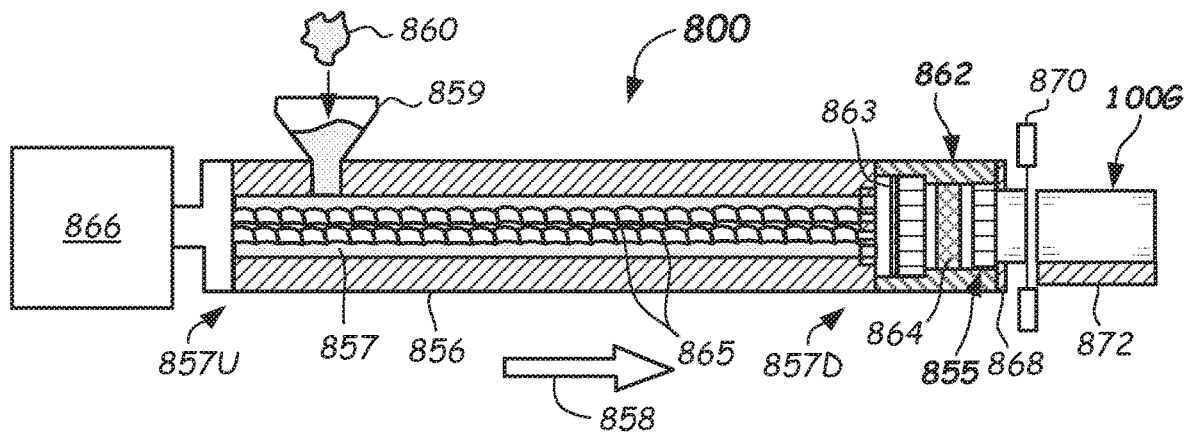
FIG. 8A schematically illustrates a cross-sectioned side view of an extruder comprising a honeycomb extrusion die useful in the manufacture of honeycomb bodies comprising the repeating channel structure according to one or more embodiments of the disclosure.

Again referring to FIG. 8A, the plasticized batch composition can be formed into the green body 100G by an extrusion method. FIG. 8A illustrates a cross-sectioned side view of an example embodiment of an extruder 800 (e.g., a continuous twin-screw extruder). The extruder 800 comprises a barrel 856 comprising a chamber 857 formed therein. The barrel 856 can be monolithic or it can be formed from a plurality of barrel segments connected successively in the longitudinal direction 858 (e.g., direction indicated by arrow). The chamber 857 extends through the barrel 856 in the longitudinal direction 858 between an upstream side 857U and a downstream side 857D. At the upstream side 857U of the chamber 857, a material supply port 859, which can comprise a hopper or other material supply structure, may be provided for supplying a batch composition mixture 860 to the extruder 800. A cartridge assembly 862 comprising a honeycomb extrusion die 855 can be provided at the downstream side 857D for extruding the batch mixture 860 into a desired shape, such as the green honeycomb body 100G. The honeycomb extrusion die 855 can be preceded by other structures, such as a generally open cavity, screen 863, homogenizer 864, and the like to facilitate the formation of a steady plug-type flow front before the plasticized batch composition mixture 860 reaches the honeycomb extrusion die 855.

As further shown in FIG. 8A, a pair of extruder screws 865 can be rotatably mounted in the barrel 856. The extruder screws 865 may be arranged generally parallel to each other, as shown, or they may be optionally arranged at various angles relative to each other. The extruder screws 865 may also be coupled to a driving mechanism 866 located outside of the barrel 856 for rotation of the extruder screws 865 in the same or different directions. It is to be understood that both the extruder screws 865 may be coupled to a single driving mechanism 866, as shown, or optionally to individual driving mechanisms (not shown). The extruder screws 865 operate to move the batch composition mixture 860 through the chamber 857 with pumping and further mixing action in the longitudinal direction 858. Further supporting structures may be provided to support the extruder screws 865 at their ends and/or along their length. Such supporting structures may comprise perforations or holes therein to allow the batch composition mixture 860 to flow there through.

The extruder cartridge 862 may further comprise extrusion hardware such as the honeycomb extrusion die 855, which can comprise a skin forming mask 868. The green body 100G is extruded from the extruder 800, and in some embodiments the skin 105 surrounding the matrix of plurality of intersecting walls 102 is also formed during extrusion along with the plurality of walls 102 and is knitted thereto. The wet green honeycomb body 100G can then be cut to length with a cutting element 870, and can be provided on and supported by a tray 872. The tray 872 can be as described in U.S. Pat. Nos. 9,440,373; 9,085,089; 8,407,915, for example. Other suitable tray configurations can be used.

Cutting can be achieved by wire cutting, saw cutting, such as with a band saw or reciprocating saw, or other cutting method. The tray 232 can be provided to a suitable dryer, such as a microwave dryer, RF dryer, hot air dyers, or combinations thereof. Suitable dryers are described in U.S. Pat. Nos. 9,335,093, 9,038,284, 7,596,885, and 6,259,078, for example. Other suitable dryers can be used.

Figure 8B:
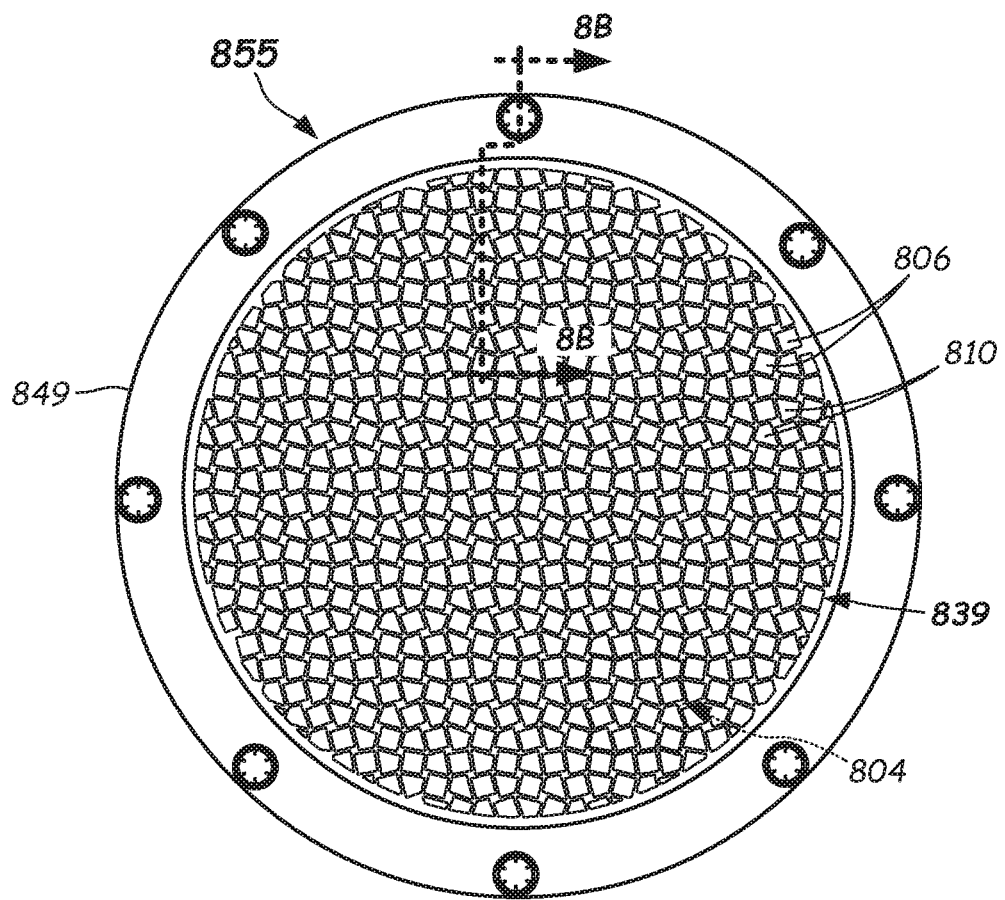
FIG. 8B schematically illustrates a front view of a honeycomb extrusion die useful in the manufacture of honeycomb bodies comprising the repeating channel structure according to one or more embodiments of the disclosure.

Now referring to FIGS. 8B-8D, the honeycomb extrusion die 855 capable of forming the wet green honeycomb body 100G will be described in more detail. Honeycomb extrusion die 855 can comprise a die body 839 such as a metal disc, a die inlet face 841 configured to receive the plasticized batch composition from the extruder 800, and a die outlet face 843 opposite from the die inlet face 841 and configured to expel plasticized batch in the form of an extrudate, which when cut is a wet green honeycomb body 100G. The honeycomb extrusion die 855 may be coupled to an end of the extruder 800 (such as a twin-screw extruder or other extruder type) that receives the batch composition 860 and forces the batch composition 860 under pressure through the honeycomb extrusion die 855.

The honeycomb extrusion die 855 comprises a die pin repeating structure 804 comprising a first pin type 806 defined by four first pin surfaces 808, wherein at least two of the four first pin surfaces 808 are parallel to one another, and in the depicted embodiment, both pairs of opposed surfaces are parallel to one another; and a second pin type 810 having at least four second pin surfaces 812, wherein four or more of the at least four second pin surfaces 814 are non-parallel with one another.

The honeycomb extrusion die 855 may comprise a plurality of relatively larger feedholes 845A and a plurality of relatively smaller feedholes 845B (a few labeled) extending from the die inlet face 841 into the die body 839. The plurality of relatively larger feedholes 845A and a plurality of relatively smaller feedholes 845B intersect with a plurality of slots 847 (a few labeled) extending into the die body 839 from the die outlet face 843. The plurality of slots 847 have a transverse slot thickness Ts (FIG. 8D), measured transversely across the respective slots 847. The slot thickness Ts is the same for all of the plurality of slots 847, except at the intersections, which may be thicker in some embodiments forming reinforcing regions 115, etc.

The slot thickness Ts may be selected based on the total shrinkage of the batch composition 860 that is used (e.g., shrinkage from extrusion through firing) so that the as-fired honeycomb body 100, etc. has a desired transverse wall thickness Tw (See FIG. 1B) as described herein. In some embodiments, the transverse slot thickness Ts may be coated thicknesses (i.e., thicknesses after applying a wear coating).

The plurality of relatively larger feedholes 845A (a few labeled) can connect with and can be configured to feed batch composition 860 to the slot intersections 849A that are configured to produce first reinforcing regions 115 (FIG. 1B). The relatively smaller feedholes 845B can connect with and are configured to feed batch composition to the regular slot intersections 849B that can be configured to produce second reinforcing regions 515 (FIG. 5A). The plurality of slots 847 (a few labeled) intersect with one another and themselves as shown in FIGS. 8A and 8D. The intersecting plurality of slots 847 form the array of first and second die pins 806, 810 (a few labeled) that are arranged in the die pin repeating structure 804 (FIG. 8B) that can be repeated across the die outlet face 843 so that the green honeycomb body 100, etc. can comprise repeating channel structures 104, etc. distributed and repeated across the entire honeycomb body 100, etc., excluding only incomplete repeating channel structures that intersect with the skin 105 and may thus be truncated thereat.

The die pin repeating structure 804 in the depicted embodiment is repeated across the entire die face 843, but it may in some embodiments comprise other die pin structures other than the die pin repeating structure 804. In other words, the repeating channel structures 104, etc. described herein may be co-mingled across the honeycomb body with other types of channel structures. For example, combinations of repeating channel structures 104, etc. as described herein and conventional honeycomb structures (e.g., square-square structures, radial wall structures, octa-square structures, and the like may be co-mingled. Further, the thickness of the walls 102 can get slightly thicker near the outer periphery of the honeycomb body, i.e., proximate the skin 105.

In the depicted embodiment, the plurality of slots 847 can be formed by plunge electron discharge machining (EDM) process, for example. Each of the array of die pins 806, 810 may take on the transverse cross-sectional shape of the first and second channel types 106, 110, etc. described herein. The honeycomb extrusion die 855 may comprise a skin-forming portion 855S comprising a skin-forming mask 857 (e.g., a ring-shaped article) that interfaces with batch composition 860 exiting from the skin forming feedholes 845S (FIG. 8C) and recessed skin-forming region outboard of the die outlet face 843 to form an extruded skin on the wet green honeycomb body 100G during the extrusion method.

Figure 8C:
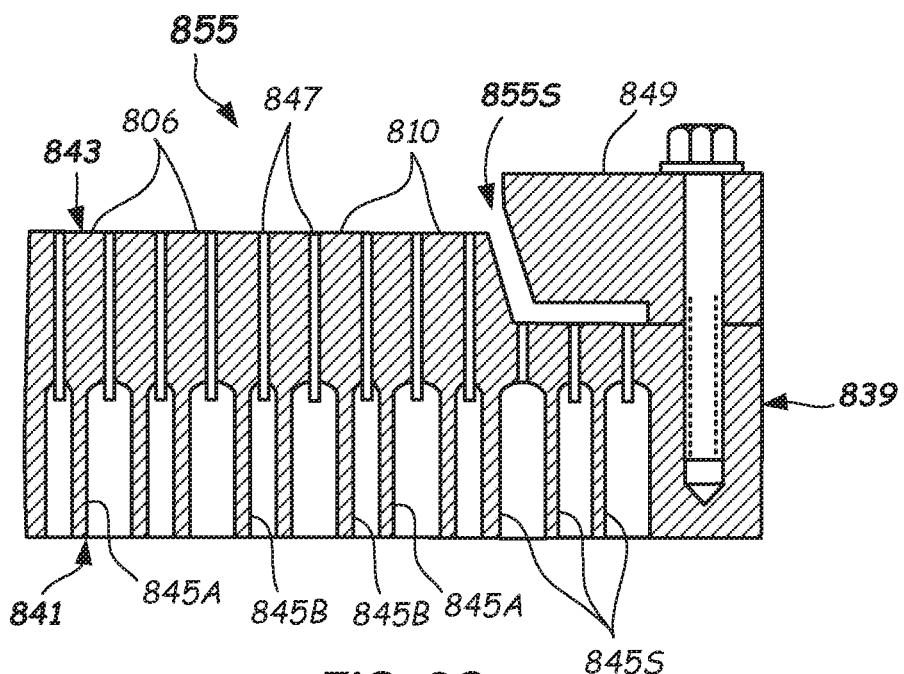
FIG. 8C schematically illustrates a cross-sectioned partial side view of the honeycomb extrusion die taken along section line 8B-8B of FIG. 8A according to one or more embodiments of the disclosure.

FIG. 8C illustrates a cross-sectional side view of a portion of the die outlet face 843 of an embodiment of honeycomb extrusion die 855, which comprises a feedhole pattern of relatively larger feedholes 845A and interspersed relatively smaller feedholes 845B shown as dotted circles, and slots 847 shown as solid lines. In the depicted embodiment, the relatively larger feedholes 845A can be comprised at every intersection of the plurality of slots 847 forming first reinforcing regions 115 (FIG. 1B). Relatively smaller feedholes 845B can be smaller and can be provided at the other intersections of the plurality of slots 847. Additional feedholes may be added to ensure good knit and ample supply of batch composition 860 to the slots 847. Moreover, the size (e.g., diameter) of the feedholes 845A, 845B may be adjusted to adjust and balance flow of the batch composition 860. Other feedhole configurations may be used in embodiments of the honeycomb extrusion die 855. Slots 847 can comprise divots and/or plenums therein to improve flow and knit of the batch composition 860 and to improve quality of the honeycomb body 100, etc.

Referring now to FIG. 9, a method of forming a honeycomb body (e.g., honeycomb body 100, or any other honeycomb body comprising the repeating channel structures described herein) will now be described. The method 900 comprises, in 902, providing a honeycomb extrusion die (e.g., honeycomb extrusion die 855)

The method 900 further comprises, in 904, extruding a plasticized batch material through the honeycomb extrusion die (e.g., honeycomb extrusion die 855) to produce a green honeycomb body (e.g., green honeycomb body 100G). The produced green honeycomb body 100, etc. comprises a repeating channel structure 104 comprising first channel types 106, etc. and second channel types 110, etc. as described herein. Various configurations of the repeating channel structure 104, etc. are described herein. Following extrusion, the honeycomb body 100G may be dried, which may in some embodiments involve further cutting wherein approximately sized (e.g., lengths) of green honeycomb bodies 100G are produced. These dried green honeycomb bodies 100G may then be fired by any suitable firing method to achieve crack-free honeycomb bodies 100, etc. in accordance with this disclosure.

The foregoing description discloses numerous example embodiments of the disclosure. Modifications of the above-disclosed honeycomb bodies, extrusion dies, and methods that fall within the scope of the disclosure will be readily apparent. For example, any combination of the parameters disclosed herein with respect to one embodiment, may be applied to other honeycomb body or extrusion die embodiments disclosed herein. Accordingly, while the present disclosure includes certain example embodiments, it should be understood that other embodiments may fall within the scope of the disclosure, as defined by the claims.

What is claimed is:

1. A honeycomb body comprising:
   intersecting porous walls forming a plurality of channels extending longitudinally and parallel to an axial axis and defining a repeating channel structure in a transverse cross-section within an X-Y plane perpendicular to the axial axis, the repeating channel structure comprising:
   a first subgroup of channels of a first channel type arranged in a first line, wherein the channels of the first channel type have a square shape in the transverse cross-section;
   a second subgroup of channels of the first channel type arranged in a second line which is parallel to the first line; and
   a third subgroup of channels interspersed between the first and second lines, wherein the channels in the third subgroup are of a second channel type which has a different shape than the channels of the first channel type and which comprises a first corner angle which is an acute included angle and a second corner angle which is an obtuse included angle;

wherein the channels in the second line have a tilted orientation in the transverse cross-section with respect to the first subgroup of channels in the first line;

wherein the third subgroup of channels of the second channel type have a polygonal shape in the transverse cross-section defined by only four surfaces;

wherein the third subgroup of channels of the second channel type have a quadrilateral shape in the transverse cross-section with two pairs of surfaces of equal length in the transverse cross-section;

wherein a first pair of the two pairs of the equal-length surfaces are longer in the transverse cross-section than a second pair of the two pairs of the equal-length surfaces;

wherein the first pair of the two pairs of the equal-length surfaces are angled to diverge from one another and comprise the acute included angle therebetween.

2. The honeycomb body of claim 1 wherein a first channel of the first line is disposed at an orientation with a first non-zero tilt angle to a second channel of the second line, wherein the second channel is a channel in the second line which is closest to the first channel, and the first non-zero tilt angle is measured between closest adjacent surfaces of the first channel and the second channel.

3. The honeycomb body of claim 2 wherein the first non-zero tilt angle ranges from 45 degrees to 80 degrees.

4. The honeycomb body of claim 3 wherein the first non-zero tilt angle ranges from 55 degrees to 70 degrees.

5. The honeycomb body of claim 1 further comprising a fourth subgroup of channels of the second channel type wherein each of the channels of the fourth subgroup of the second channel type are arranged along a straight line in the transverse cross-section.

6. The honeycomb body of claim 1 wherein a channel of the first channel type comprises a first cross-sectional area in the transverse cross-section and a channel of the second channel type comprises a second cross-sectional area in the transverse cross-section that is different than the first cross-sectional area.

7. The honeycomb body of claim 6 further comprising an area ratio (AR) of the first cross-sectional area divided by the second cross-sectional area, wherein $0.5 \leq AR \leq 2.0$.

8. The honeycomb body of claim 1 wherein the third subgroup of channels is arranged in a third line between the first and second lines.

9. The honeycomb body of claim 1 further comprising a fourth subgroup of channels arranged in a line wherein the channels of the fourth subgroup have the shape of the second channel type rotated 180 degrees from an orientation of the channels of the third subgroup.

10. The honeycomb body of claim 1 wherein the channels of the second channel type have the quadrilateral shape with four sides which are non-parallel to each other.

11. A honeycomb body comprising:
intersecting porous walls forming a plurality of channels extending longitudinally and parallel to an axial axis and defining a repeating channel structure in a transverse cross-section within an X-Y plane perpendicular to the axial axis, the repeating channel structure comprising:
a first subgroup of channels of a first channel type arranged in a first line, wherein the channels of the first channel type have a square shape in the transverse cross-section;
a second subgroup of channels of the first channel type arranged in a second line which is parallel to the first line; and
a third subgroup of channels interspersed between the first and second lines, wherein the channels in the third subgroup are of a second channel type which has a different shape than the channels of the first channel type and which comprises a first corner angle which is an acute included angle and a second corner angle which is an obtuse included angle;
wherein the channels in the second line have a tilted orientation in the transverse cross-section with respect to the first subgroup of channels in the first line;
wherein the third subgroup of channels of the second channel type have a polygonal shape in the transverse cross-section defined by only four surfaces;
wherein the third subgroup of channels of the second channel type have a quadrilateral shape in the transverse cross-section with two pairs of surfaces of equal length in the transverse cross-section;
wherein a first pair of the two pairs of the equal-length surfaces are longer in the transverse cross-section than a second pair of the two pairs of the equal-length surfaces;
wherein the second pair of the two pairs of the equal-length surfaces are angled to diverge from one another and comprise the obtuse included angle therebetween.

12. The honeycomb body of claim 11 wherein a first channel of the first line is disposed at an orientation with a first non-zero tilt angle to a second channel of the second line, wherein the second channel is a channel in the second line which is closest to the first channel, and the first non-zero tilt angle is measured between closest adjacent surfaces of the first channel and the second channel.

13. The honeycomb body of claim 12 wherein the first non-zero tilt angle ranges from 45 degrees to 80 degrees.

14. The honeycomb body of claim 11 wherein a channel of the first channel type comprises a first cross-sectional area in the transverse cross-section and a channel of the second channel type comprises a second cross-sectional area in the transverse cross-section that is different than the first cross-sectional area.

15. The honeycomb body of claim 11 wherein the third subgroup of channels is arranged in a third line between the first and second lines.

16. The honeycomb body of claim 11 wherein the channels of the second channel type have the quadrilateral shape with four sides which are non-parallel to each other.

* * * * *